(12) United States Patent
Yamada et al.

(10) Patent No.: US 9,227,528 B2
(45) Date of Patent: Jan. 5, 2016

(54) SEAT SLIDE APPARATUS FOR VEHICLE

(71) Applicant: AISIN SEIKI KABUSHIKI KAISHA, Kariya-shi (JP)

(72) Inventors: Yukifumi Yamada, Toyota (JP); Naoki Goto, Tokai (JP); Mikihito Nagura, Okazaki (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/329,090

(22) Filed: Jul. 11, 2014

(65) Prior Publication Data
US 2015/0034791 A1 Feb. 5, 2015

(30) Foreign Application Priority Data

Jul. 30, 2013 (JP) .................................. 2013-157990
Feb. 12, 2014 (JP) .................................. 2014-024619

(51) Int. Cl.
*B60N 2/08* (2006.01)
*B60N 2/12* (2006.01)
(Continued)

(52) U.S. Cl.
CPC *B60N 2/123* (2013.01); *B60N 2/07* (2013.01); *B60N 2/0705* (2013.01); *B60N 2/08* (2013.01); *B60N 2/0806* (2013.01); *B60N 2/0818* (2013.01); *B60N 2/0843* (2013.01); *B60N 2/0862* (2013.01); *B60N 2/0868* (2013.01); *B60N 2/20* (2013.01)

(58) Field of Classification Search
CPC ...... B60N 2/08; B60N 2/0806; B60N 2/0868; B60N 2/0818; B60N 2/0862; B60N 2/123

USPC .................................................. 248/424, 429
See application file for complete search history.

(56) References Cited

U.S. PATENT DOCUMENTS

| 7,191,995 B2 * | 3/2007 | Kim ..................... | B60N 2/0705 248/429 |
| 2002/0060281 A1 * | 5/2002 | Okazaki ............... | B60N 2/0705 248/424 |

(Continued)

FOREIGN PATENT DOCUMENTS

| DE | 19617691 C1 * | 5/1997 | .......... B60N 2/0705 |
| DE | 10041605 C1 * | 1/2002 | .......... B60N 2/0705 |

(Continued)

OTHER PUBLICATIONS

U.S. Appl. No. 14/190,293, filed Feb. 26, 2014, Yukifumi Yamada, et al.

*Primary Examiner* — Terrell McKinnon
*Assistant Examiner* — Eret McNichols
(74) *Attorney, Agent, or Firm* — Oblon, McClelland, Maier & Neustadt, L.L.P.

(57) ABSTRACT

A seat slide apparatus for a vehicle includes a tower rail, an upper rail, a memory base arranged above a bottom wall portion of the lower rail, a restriction piece holding the memory base so that the memory base is restricted from moving, a memory pin attached to the memory base in a manner that advance and retract of the memory pin relative to the memory base is allowed, the memory pin engages with the lower rail in a protruding state, the memory pin disengages in a retracted state, an interlocking mechanism pushing a lock member and the memory pin in a forward-folded state of a seatback, and a holding member holding the protruding state of the memory pin and allowing the memory base to move.

12 Claims, 24 Drawing Sheets

(51) Int. Cl.
*B60N 2/07* (2006.01)
*B60N 2/20* (2006.01)

(56) References Cited

U.S. PATENT DOCUMENTS

| | | | | |
|---|---|---|---|---|
| 2004/0238712 | A1* | 12/2004 | Oh | B60N 2/0715 248/430 |
| 2008/0163717 | A1* | 7/2008 | Weber | B60N 2/0705 74/527 |
| 2012/0032059 | A1* | 2/2012 | Seille | B60N 2/0705 248/429 |
| 2013/0153735 | A1* | 6/2013 | Ruthman | B60N 2/0705 248/429 |
| 2015/0151650 | A1* | 6/2015 | Kim | B60N 2/0705 248/429 |

FOREIGN PATENT DOCUMENTS

| | | | | |
|---|---|---|---|---|
| DE | 10040593 | A1 * | 3/2002 | ............ B60N 2/0705 |
| DE | 10152208 | A1 * | 5/2003 | ............... B60N 2/06 |
| DE | 102010063615 | A1 * | 2/2012 | ............ B60N 2/0525 |
| EP | 0615879 | A1 * | 9/1994 | ................ B60N 2/01 |
| EP | 0947380 | A1 * | 10/1999 | ......... B60N 2/01541 |
| JP | 2006-281814 | | 10/2006 | |
| KR | 20060082244 | A * | 7/2006 | ............ B60N 2/0806 |
| WO | WO 2009033570 | A2 * | 3/2009 | ............ B60N 2/0806 |
| WO | WO 2010080601 | A1 * | 7/2010 | ............ B60N 2/0705 |
| WO | WO 2011123091 | A1 * | 10/2011 | ............ B60N 2/0818 |
| WO | WO 2012007515 | A1 * | 1/2012 | ............ B60N 2/0715 |

\* cited by examiner

Width direction

Rear ← → Front

Width direction

Width direction

F I G. 24
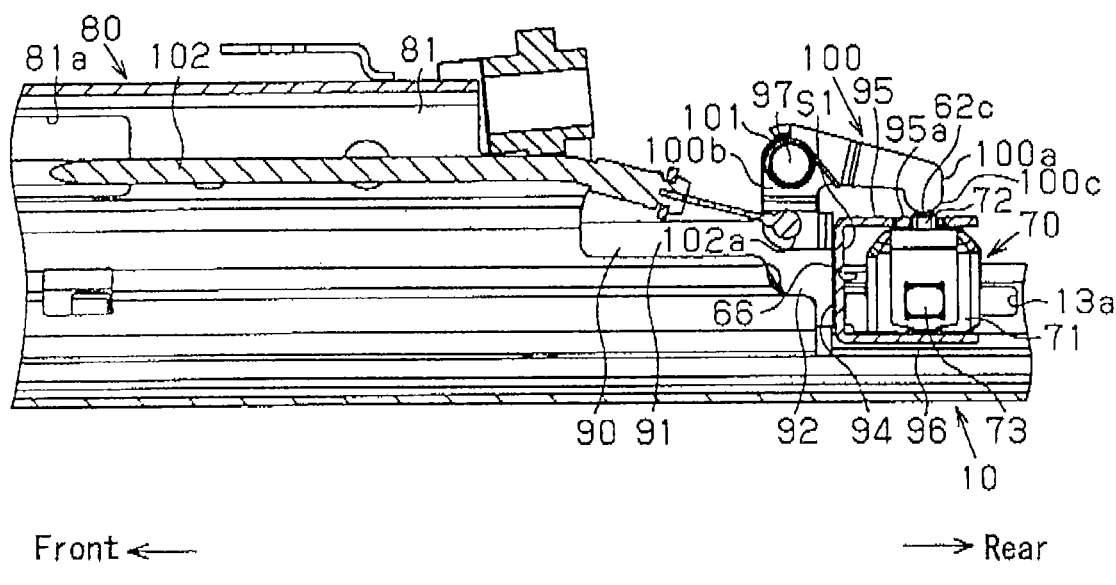
Front ← → Rear

SEAT SLIDE APPARATUS FOR VEHICLE

CROSS REFERENCE TO RELATED APPLICATIONS

This application is based on and claims priority under 35 U.S.C. §119 to Japanese Patent Application 2013-157990, filed on Jul. 30, 2013, and Japanese Patent Application 2014-024619, filed on Feb. 12, 2014, the entire contents of which are incorporated herein by reference.

TECHNICAL FIELD

This disclosure generally relates to a seat slide apparatus for a vehicle.

BACKGROUND DISCUSSION

A known seat slide apparatus for a vehicle may include a memory function. According to the known memory function, in a case where an upper rail moves in a front direction of a seat relative to a lower rail when a seatback is in a forward-folded state, the memory function memorizes a relative position of the lower rail and the upper rail relative to each other before the movement of the upper rail (which will be referred to also as "a memory position"). For example, a known seat slide apparatus for a vehicle described in JP2006-281814A (hereinafter referred to as Patent reference 1) includes a component for position memory which is provided at a bottom wall portion of a lower rail opening upwardly and including a substantially U-shaped cross section. The component for position memory is arranged to extend in a long-side direction of the lower rail. In addition, the known seat slide apparatus includes a memory base which is movably provided at the component for position memory, and is engageable with and disengageable from the upper rail. The known seat slide apparatus includes a memory plate which is supported at the memory base and is engageable with and disengageable from the component for position memory. An engagement state between the upper rail and the memory base, and an engagement state between the component for position memory and the memory plate have a contradictory relationship to each other.

For example, in a case where the lower rail and the upper rail are moved relative to each other in a normal operation state, the memory base and the memory plate are configured to move integrally with the upper rail in a long-side direction of the component for position memory.

On the other hand, in a case where the upper rail moves in the front direction of the seat relative to the lower rail when the seatback is in the forward-folded state, it is configured that the memory plate is engaged with the component for position memory, and the memory plate and the memory base remain at a present position. Thereafter, in a case where the upper rail moves in a rear direction of the seat relative to the lower rail, as the relative position of the lower rail and the upper rail returns to the memory position, it is configured that the upper rail comes in contact with the memory base. Accordingly, a further movement of the upper rail is restricted.

According to Patent reference 1, the component for position memory and the like are provided at the bottom wall portion of the lower rail to achieve the above-described memory function. However, depending on a specification of the lower rail and/or a fixation structure of the lower rail, a space for arranging the component for position memory and the like may not be ensured at the bottom wall portion of the lower rail, and therefore the memory function may not be achieved.

A need thus exists for a seat slide apparatus for a vehicle which is not susceptible to the drawback mentioned above.

SUMMARY

According to an aspect of this disclosure, a seat slide apparatus for a vehicle includes a lower rail attached to a vehicle floor, the lower rail including a pair of vertical wall portions arranged side by side with each other to face each other in a width direction of the lower rail, a bottom wall portion connecting lower ends of the respective vertical wall portions to each other, a pair of flanges extending from upper ends of the respective vertical wall portions inwardly in the width direction to face each other and folded back towards the lower ends of the vertical wall portions, each of the flanges being provided with a plurality of fitting recessed portions arranged side by side with one another in a front/rear direction of a seat, an upper rail attached to the seat and connected to the lower rail in a manner that a relative movement of the upper rail relative to the lower rail is allowed, the upper rail including an accommodation portion provided at a rear end of the upper rail, the seat including a seatback that is provided at a rear end portion of the seat in the front/rear direction of the seat, a lock member selectively applying restriction on the relative movement between the lower rail and the upper rail, a memory base disposed between the flanges of the lower rail in the width direction and arranged above the bottom wall portion of the lower rail, the memory base being restricted from moving in the front direction of the seat relative to the accommodation portion in an accommodated state in which the memory base is accommodated in the accommodation portion, a restriction piece holding the memory base in the accommodated state by a biasing force so that the memory base is restricted from moving in a rear direction of the seat relative to the accommodation portion, a memory pin attached to the memory base in a manner that advance and retract of the memory pin in the width direction relative to the memory base is allowed, the memory pin being fitted in one of the fitting recessed portions of the lower rail so that the memory pin engages with the lower rail in a case where the memory pin is in a protruding state in which the memory pin protrudes outwardly in the width direction, the memory pin being disengaged from one of the fitting recessed portions in a retracted state in which the memory pin is retracted inwardly in the width direction so that the memory pin disengages from the lower rail, a biasing member biasing the memory pin in a direction in which the memory pin retracts inwardly in the width direction, an interlocking mechanism, in a forward-folded state of the seatback, pushing the lock member in a direction in which the restriction on the relative movement of the upper rail relative to the lower rail is released and pushing the memory pin so that the memory pin protrudes outwardly in the width direction, and a holding member holding the protruding state of the memory pin and allowing the memory base to move in the rear direction of the seat relative to the accommodation portion against the biasing force of the restriction piece, the holding member releasing the protruding state of the memory pin in a case where the holding member is pushed by the upper rail moving in the rear direction of the seat.

According to an aspect of this disclosure, a seat slide apparatus for a vehicle includes a lower rail configured to be fixed to a vehicle floor, the lower rail including a pair of vertical wall portions arranged side by side with each other to face each other in a width direction of the lower rail, a bottom wall portion connecting lower ends of the respective vertical wall portions to each other, a pair of flanges extending from upper ends of the respective vertical wall portions inwardly in the width direction to face each other and folded back towards the lower ends of the vertical wall portions, each of the flanges being provided with a plurality of fitting recessed portions arranged side by side with one another in a front/rear direction of a seat, an upper rail configured to be fixed to the seat and connected to the lower rail in a manner that a relative movement of the upper rail relative to the lower rail is allowed, the upper rail including an accommodation portion provided at a rear end of the upper rail, the seat including a seatback that is provided at a rear end portion of the seat in the front/rear direction of the seat, a lock member selectively applying restriction on the relative movement between the lower rail and the upper rail, a memory base disposed between the flanges of the lower rail in the width direction and arranged above the bottom wall portion of the lower rail, the memory base being restricted from moving in the front direction of the seat relative to the accommodation portion in an accommodated state in which the memory base is accommodated in the accommodation portion, a restriction piece holding the memory base in the accommodated state by a biasing force so that the memory base is restricted from moving in a rear direction of the seat relative to the accommodation portion, a memory pin attached to the memory base in a manner that advance and retract of the memory pin in the width direction relative to the memory base is allowed, the memory pin being fitted in one of the fitting recessed portions of the lower rail so that the memory pin engages with the lower rail in a case where the memory pin is in a protruding state in which the memory pin protrudes outwardly in the width direction, the memory pin being disengaged from one of the fitting recessed portions in a retracted state in which the memory pin is retracted inwardly in the width direction so that the memory pin disengages from the lower rail, a biasing member biasing the memory pin in a direction in which the memory pin retracts inwardly in the width direction, an interlocking mechanism, in a forward-folded state of the seatback, pushing the lock member in a direction in which the restriction on the relative movement of the upper rail relative to the lower rail is released and pushing the memory pin so that the memory pin protrudes outwardly in the width direction, and a holding member holding the protruding state of the memory pin and allowing the memory base to move in the rear direction of the seat relative to the accommodation portion against the biasing force of the restriction piece, the holding member releasing the protruding state of the memory pin in a case where the holding member is pushed by the upper rail moving in the rear direction of the seat.

BRIEF DESCRIPTION OF THE DRAWINGS

The foregoing and additional features and characteristics of this disclosure will become more apparent from the following detailed description considered with the reference to the accompanying drawings, wherein:

FIG. 24 is a longitudinal sectional view illustrating the third embodiment.

DETAILED DESCRIPTION

A first embodiment of a seat slide apparatus for a vehicle will be explained with reference to the attached drawings. In the following explanation, "a front/rear direction" corresponds to a vehicle front/rear direction.

Figure 19:
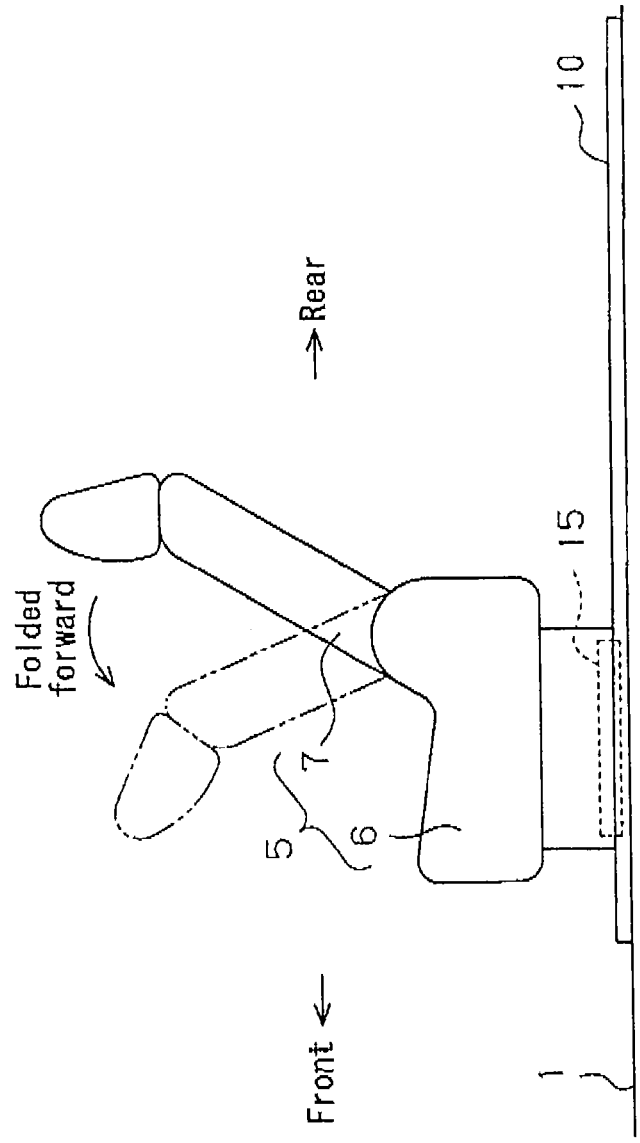
FIG. 19 is a side view illustrating a seat for a vehicle to which the embodiments disclosed here are applied.
Figure 20:
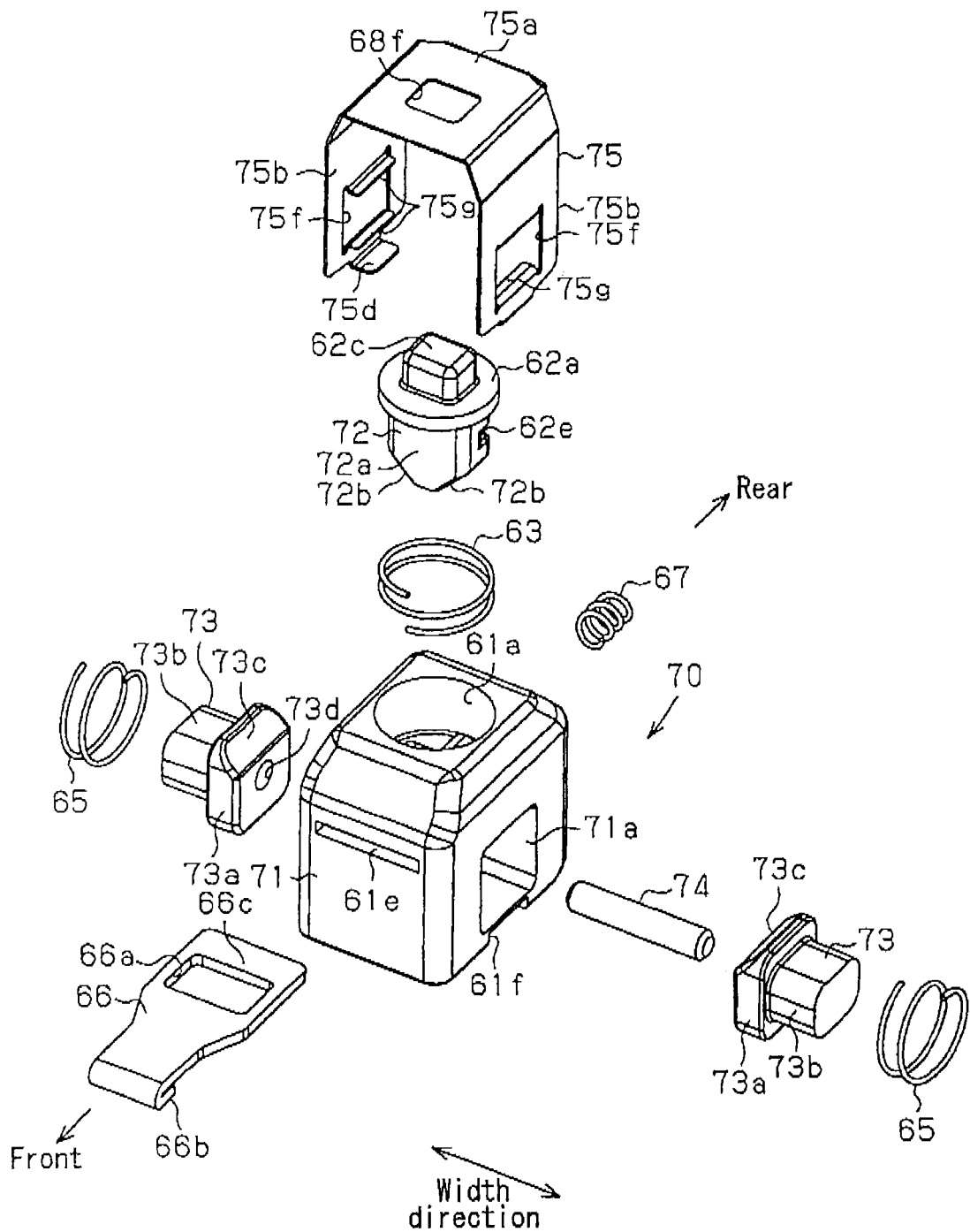
FIG. 20 is an exploded perspective view of a memory piece of a second embodiment disclosed here.

As illustrated in FIG. 19, a lower rail 10 is attached to a vehicle floor 1 so as to extend in the front/rear direction. An upper rail 15 is attached to the lower rail 10 so as to be movable relative to the lower rail 10 in the front/rear direction. In the present embodiment, a direction of a relative movement between the upper rail 15 and the lower rail 10 that corresponds to a long-side direction of each of the upper rail 15 and the lower rail 10 (a front/rear direction of a seat) coincides with the front/rear direction.

Figure 1:
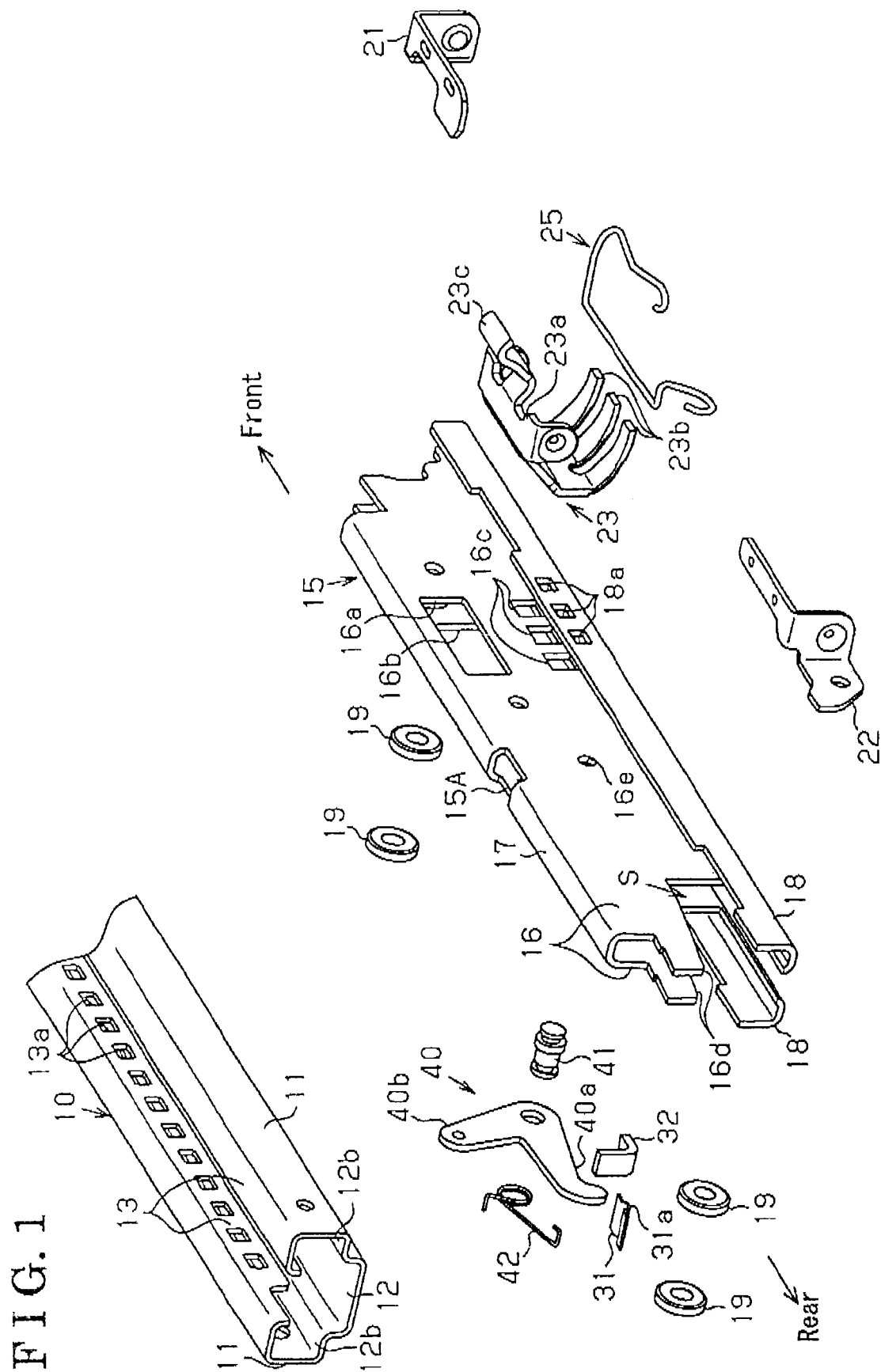
FIG. 1 is an exploded perspective view illustrating a first embodiment disclosed here.
Figure 2:
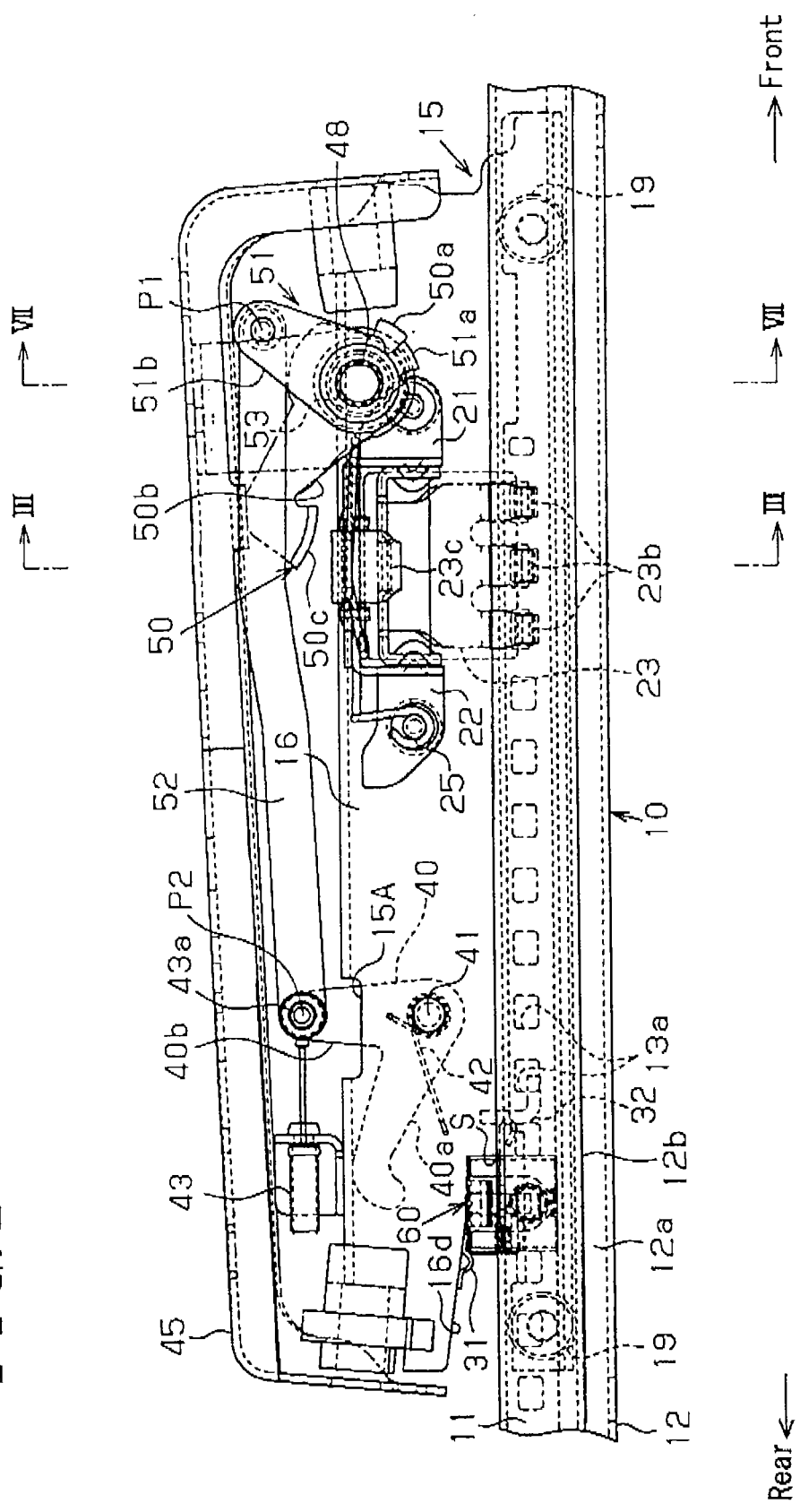
FIG. 2 is a side view illustrating the first embodiment.

The lower rails 10 are provided as a pair to face each other in a width direction which corresponds to a direction orthogonal to a paper surface on which FIG. 2 is drawn. The upper rails 15 are provided as a pair to face each other in the width direction. In FIG. 1, the lower rail 10 and the upper rail 15 which are arranged at the left side relative to a front direction (i.e., a front direction of a seat) is explained. At both the upper rails 15, a seat 5 forming a seating portion for an occupant is attached to and supported. The seat 5 includes a seat cushion 6 which forms a seating surface, and a seatback 7 supported at a rear end portion of the seat cushion 6 so as to be tiltable.

As illustrated in FIG. 1, the lower rail 10 made of plate material includes a pair of first vertical wall portions 11 (i.e., a pair of vertical wall portions) and a bottom wall portion 12. In the following explanation, the term "vertical wall portion" includes a substantially vertical wall portion. The first vertical wall portions 11 are provided at respective sides (i.e., opposed sides) of the lower rail 10 in the width direction so as to extend in an up/down direction. The first vertical wall portions 11 are arranged to face each other in the width direction. The bottom wall portion 12 connects lower ends of the respective first vertical wall portions 11 to each other. A first flange 13 (i.e., a flange) is continuously formed at an upper end of each of the first vertical wall portions 11. The first flange 13 which projects inwardly in the width direction is pulled back towards a lower end of the corresponding first vertical wall portion 11.

Figure 3:
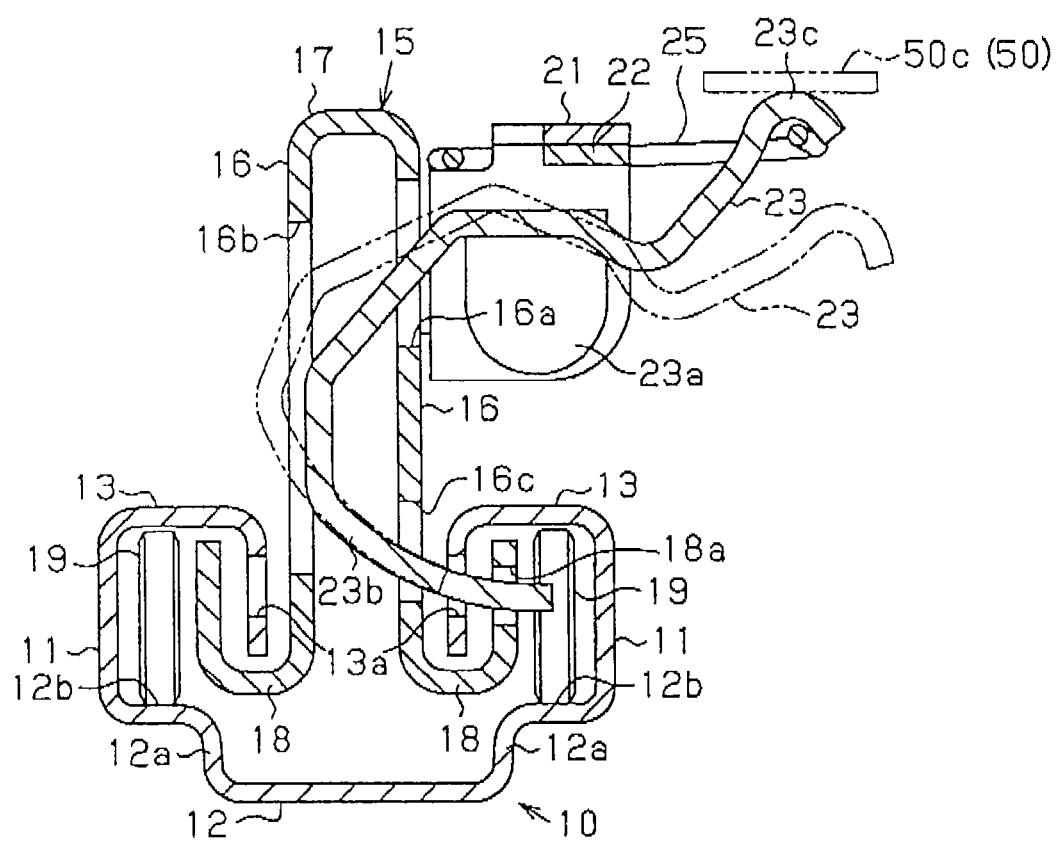
FIG. 3 is a cross-sectional view taken along line in FIG. 2.

As illustrated in FIG. 2, plural lock holes 13a (i.e., fitting recessed portions) each opening in the width direction are provided at each of the first flanges 13 of the lower rail 10. The lock holes 13a are provided in a manner that the lock holes 13a provided at one of the pair of the first flanges 13 and the lock holes 13a provided at the other of the pair of the first flanges 13 face each other in the width direction. The lock holes 13a are provided along a substantially entire length in the long-side direction of the first flange 13 to be spaced away from each other for a predetermined distance in the long-side direction (the font/rear direction). Each of the lock holes 13a includes a substantially rectangular shape extending in the front/rear direction. As illustrated in FIG. 3, each of side portions of the bottom wall portion 12 in the width direction is raised upwardly so as to form a passage portion 12b via a step portion 12a (that is, the step portions 12a are provided as a pair).

The upper rail 15 which is made of plate material includes a pair of second vertical wall portions 16 and a cover wall portion 17. The pair of second vertical wall portions 16 is arranged to extend in the up/down direction between the first flanges 13 of the lower rail 10. The second vertical wall portions 16 are arranged to face each other in the width direction. The cover wall portion 17 connects upper ends of the second vertical wall portions 16 to each other. A second flange 18 is continuously formed at a lower end of each of the second vertical wall portions 16. The second flange 18 which projects outwardly in the width direction is pulled back towards an upper end of the second vertical wall portion 16 so as to be surrounded by the corresponding first vertical wall portion 11 and the first flange 13.

A first through hole 16a formed in a substantially quadrangular shape is provided at an upper end portion of the second vertical wall portion 16, out of the pair of second vertical wall portions 16, which is arranged at one side (the right side in FIG. 1, that is, a side opposing the other lower rail 10 and the like of the pair in the width direction, the one side will be also referred to as "an inner side"). A second through hole 16b formed in a substantially quadrangular shape is provided at the second vertical wall portion 16, out of the pair of second vertical wall portions 16, which is arranged at the other side (the left side in FIG. 1, that is, a side away from the other lower rail 10 and the like of the pair in the width direction, the other side will be also referred to as "an outer side"). The first through hole 16a and the second through hole 16b are arranged at substantially the same positions as each other in the front/rear direction. An opening width of the second through hole 16b in the up/down direction is specified to be greater than an opening width of the first through hole 16a in the up/down direction.

As illustrated in FIG. 1, at a lower end portion of the second vertical wall portion 16 at the inner side, plural (for example, three) first insert holes 16c are provided to be spaced away from each other for the predetermined distance in the long-side direction (the front/rear direction). Further, at the second flange 18 at the inner side, plural (for example, three) second insert holes 18a are provided to be spaced away from each other for the predetermined distance in the long-side direction (the front/rear direction). The first insert holes 16c are disposed at substantially the same positions as the respective second insert holes 18a in the front/rear direction. The positions of the first and second insert holes 16c and 18a correspond to a range where the first and second through holes 16a and 16b are arranged in the front/rear direction.

A pair of wheels 19, which are provided at front and rear as a pair, is supported at each of the second flanges 18 of the upper rail 15 in a rolling manner. Specifically, the wheels 19 are supported at the corresponding passage portions 12b of the lower rail 10 in the rolling manner so that the upper rail 15 is connected to the lower rail 10 to be movable relative thereto in the long/side direction (the front-rear direction).

A pair of support brackets 21, 22 is secured or fastened to the second vertical wall portion 16 at the inner side in a state that the support brackets 21, 22 are positioned at a front side and a rear side, respectively, with the first through hole 16a interposed therebetween. The support brackets 21, 22 support a lock lever 23 (i.e., a lock member) made of plate material, for example. The lock lever 23 is supported by the brackets 21, 22 at an inner side of the second vertical wall portion 16 in the width direction so as to be rotatable about an axis line that extends in the front/rear direction.

The lock lever 23 includes a body portion 23a and plural (for example, three) lock protrusions 23b. The body portion 23a is formed substantially in a shape of a letter U and is supported by the support brackets 21, 22 so as to be rotatable. Each of the lock protrusions 23b projects downwardly from the body portion 23a. The lock protrusions 23b are disposed so as to correspond to the positions of the first and second insert holes 16c and 18a in the front/rear direction.

As illustrated in FIG. 3, the lock lever 23 that is sequentially inserted to the first and second through holes 16a and 16b from the inner side in the width direction is configured so that the lock protrusions 23b which penetrate through the respective first insert holes 16c are sequentially insertable to the corresponding lock holes 13a at the inner side and the second insert holes 18a in association with the rotation of the lock lever 23 about the axis line thereof. Then, as illustrated in FIG. 3 with solid lines, in a case where the lock protrusions 23b of the lock lever 23 are inserted to be positioned within the corresponding lock holes 13a and second insert holes 18a, the relative movement between the lower rail 10 and the upper rail 15 is restricted. On the other hand, as illustrated in FIG. 3 with double-dotted lines, in a case where the lock lever 23 rotates in the clockwise direction in FIG. 3 so that the lock protrusions 23b disengage from the corresponding second insert holes 18a and lock holes 13a, the restriction on the relative movement between the lower rail 10 and the upper rail 15 is released.

As illustrated in FIG. 1, the lock lever 23 includes an input portion 23e formed substantially in a shape of a letter S and projecting inward in the width direction and obliquely upward from a center portion of the body portion 23a in the front/rear direction. One end of a lock spring 25 made of a single wire rod is engaged and locked at the input portion 23c. The other end of the lock spring 25 is engaged and locked at the support bracket 22 so that the lock lever 23 is biased to rotate in a direction where the input portion 23c is lifted up, i.e., the direction where the lock protrusions 23b are inserted to the corresponding lock holes 13a and second insert holes 18a. That is, in a case where the lock lever 23 receives an operation force for lowering the input portion 23c against a biasing force of the lock spring 25, the lock lever 23 may release the restriction on the relative movement between the lower rail 10 and the upper rail 15 relative to each other.

Figure 4:
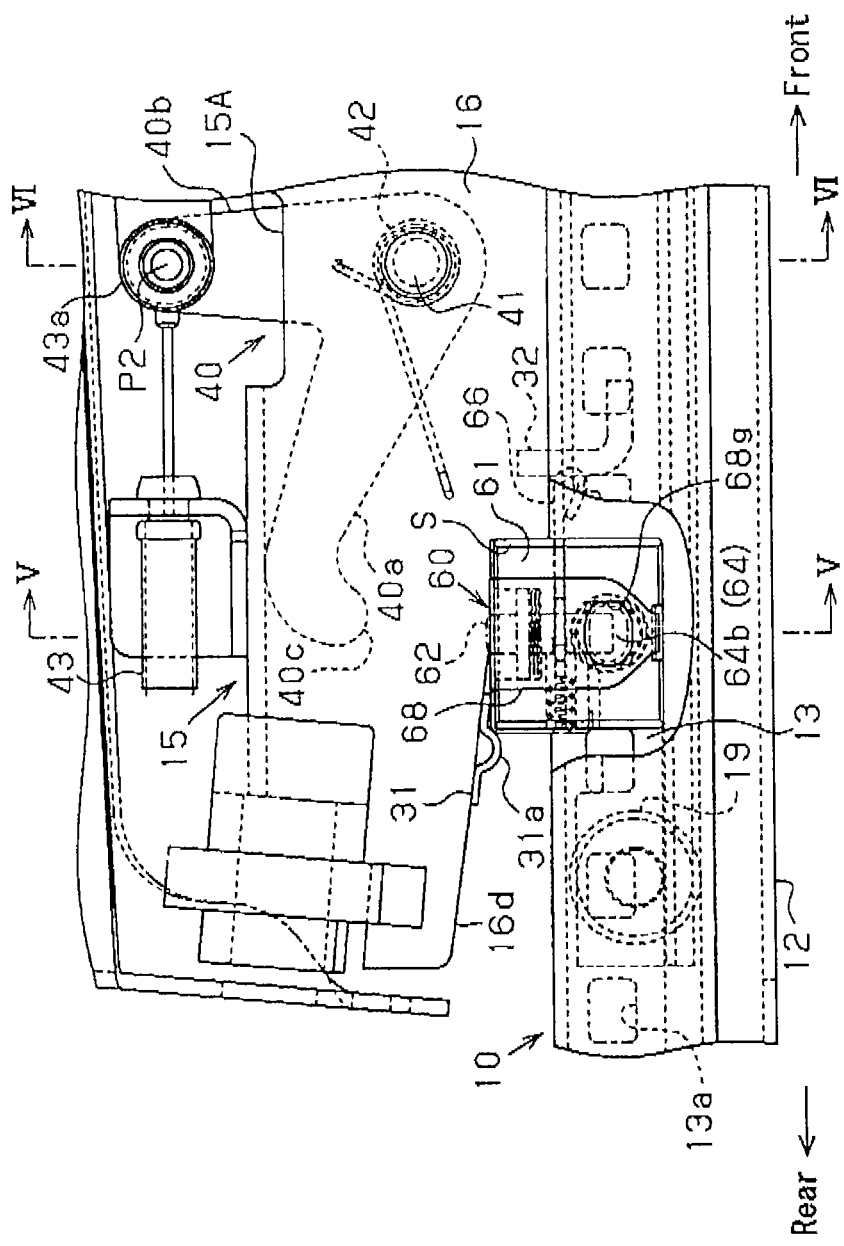
FIG. 4 is an enlarged side view illustrating the first embodiment.
Figure 5:
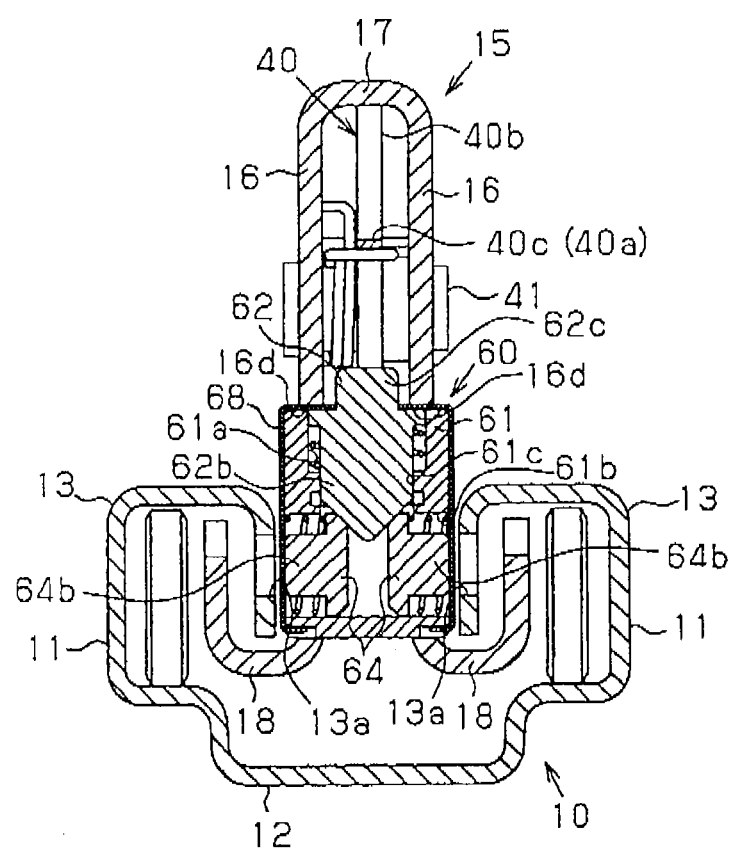
FIG. 5 is a cross-sectional view taken along line V-V in FIG. 4.

Next, peripheral configurations of one of the lower rails 10 in the pair, and the like, provided at one side (i.e., a first side) of the seat 5 in the width direction will be explained. As illustrated in FIGS. 4 and 5, a memory piece 60 is arranged above the bottom wall portion 12 of the lower rail 10. A memory base 61 forms an outer shape of the memory piece 60. The memory base 61 includes a width that is smaller than a distance between the first flanges 13 of the lower rail 10 in the width direction. The memory base 61 is formed in a substantially block shape and is disposed between the first flanges 13 to be movable in the front/rear direction (the front/rear direction of the seat).

A cut-out 16d formed in a substantially quadrangular shape is provided at a rear end of each of the second vertical wall portions 16 of the upper rail 15. The cut-out 16d is defined by a lower surface extending in the front/rear direction, an upper surface inclined upwardly towards a rear side and a front end surface connecting a front end of the lower surface and a front end of the upper surface to each other. A range of the front end surface of the cut-out 16d in the up/down direction is specified to match a range of a front end surface of the memory piece 60 in the up/down direction.

A restriction piece 31 (i.e., a restriction piece) which is made of, for example, metal plate is provided at the cut-outs 16d. Specifically, end portions of the restriction piece 31 are joined to the respective upper surfaces of the cut-outs 16d in a manner that the restriction piece 31 spans across the cut-outs 16d in the width direction. The restriction piece 31a includes a restriction portion 31a which is curved downwardly. In a state where a front end surface of the memory base 61 is in contact with the front end surfaces of the respective cut-outs 16d (this state will be referred to also as "an accommodated state"), the restriction portion 31a is in contact with or is close to an upper portion of a rear end of the memory piece 60. Accordingly, in the accommodated state, the memory base 61 (the memory piece 60) is basically restricted by the restriction portion 31a from moving in the rear direction of the seat relative to the upper rail 15. The memory base 61 is restricted by the front end surfaces of the cut-outs 16d from moving in the front direction of the seat relative to the upper rail 15.

As described above, the memory base 61 in the accommodated state is disposed between the first flanges 13 and is movable in the front/rear direction integrally with the upper rail 15. A space portion between the front end portions of the cut-outs 16d in the width direction forms an accommodation portion S.

Figure 13:
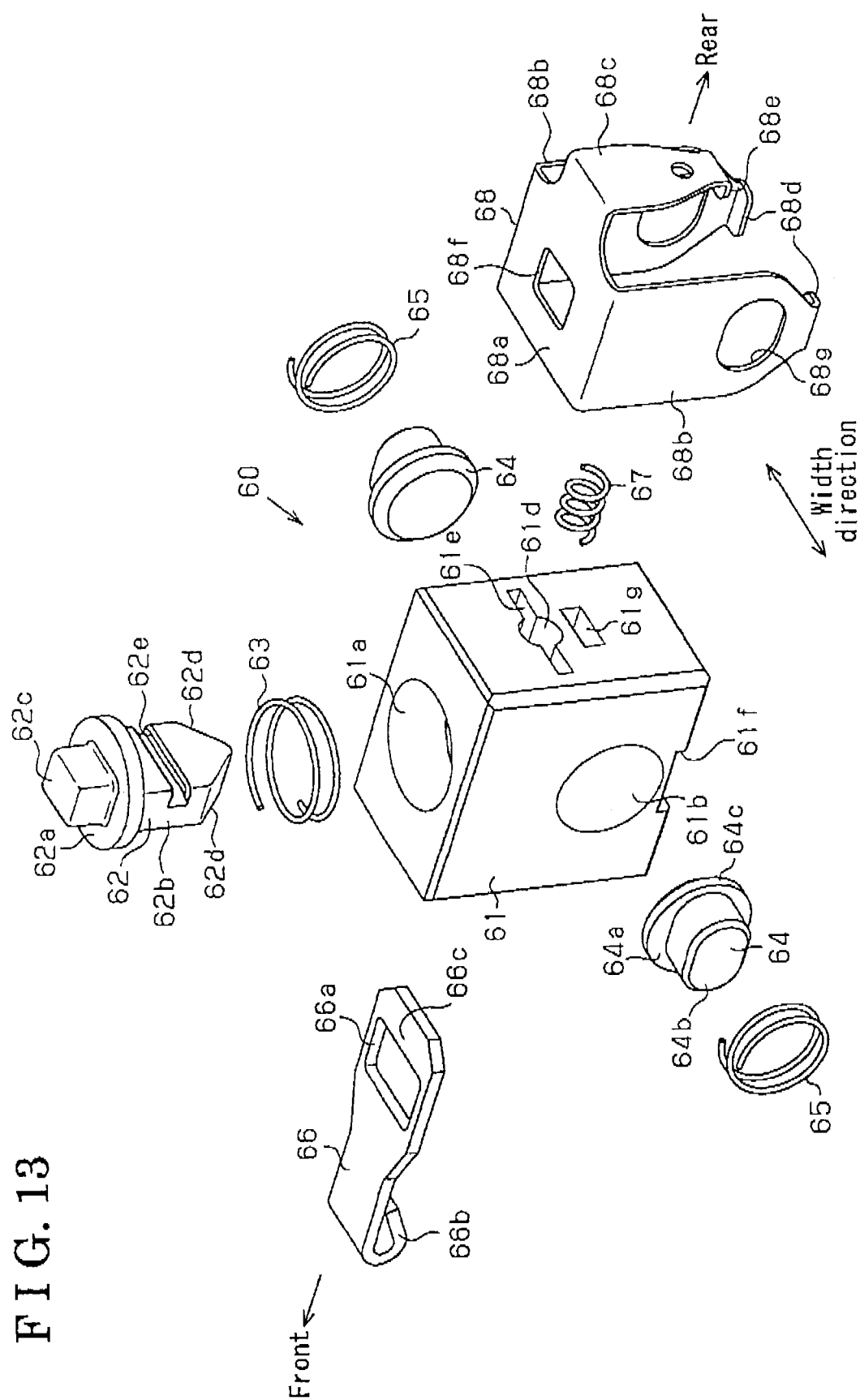
FIG. 13 is an exploded perspective view illustrating a memory piece according to the first embodiment.
Figure 14A:
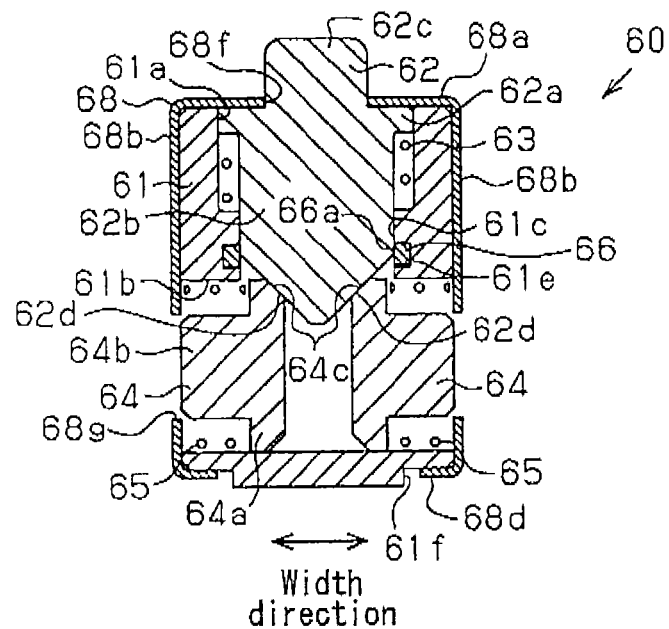
FIG. 14A is a transverse sectional view of the memory piece in a state where a memory pin is retracted inward in a width direction according to the first embodiment.
Figure 14B:
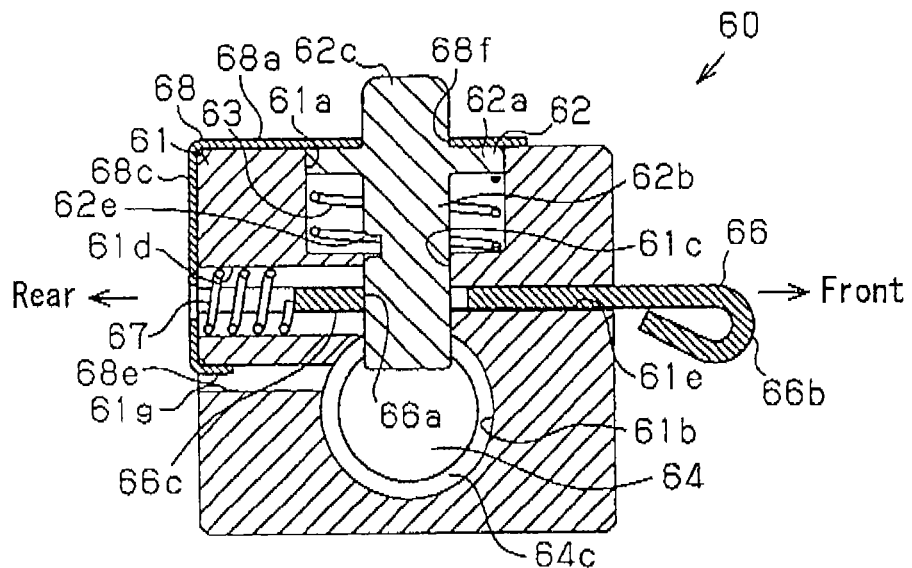
FIG. 14B is a longitudinal sectional view of the memory piece in the state where the memory pin is retracted inward in the width direction.

As illustrated in FIGS. 13, 14A and 14B, the memory base 61 includes a guide opening 61a opening upwardly and formed in a substantially circular shape. The memory base 61 includes a guide hole 61b formed in a substantially circular shape and arranged at a position corresponding the positions of the lock holes 13a in the up/down direction. The guide hole 61b is positioned below relative to the guide opening 61a. The guide hole 61b provides communication in the width direction, that is, the guide hole 61b is a through hole penetrating the memory base 61 in the width direction. The memory base 61 also includes a communication hole 61c formed in a substantially quadrangular shape and providing communication between the guide opening 61a and the guide hole 61b in the up/down direction. The communication hole 61c includes an opening area that is smaller than an opening area of the guide opening 61a so that the communication hole 61c is included within the guide opening 61a.

A coil spring 63 is accommodated in the guide opening 61a of the memory base 61 in a state that a distal end of the coil spring 63 is in contact with and pressed against a peripheral edge portion of the communication hole 61c. An up/down pin 62 is attached to the guide opening 61a of the memory base 61. The up/down pin 62 includes a flange 62a having a substantially disc shape formed to match an inner circumferential surface of the guide opening 61a. The up/down pin 62 includes a guide protrusion 62b protruding downwardly from a central portion of the flange 62a and inserted into the coil spring 63. The up/down pin 62 includes a head portion 62c formed in a substantially quadrangular column and protruding upwardly from the central portion of the flange 62a.

A base end portion of the guide protrusion 62b is formed in a substantially quadrangular column to match an outer shape of the communication hole 61c. On the other hand, a pair of inclined surfaces 62d is provided at a distal end portion of the guide protrusion 62b. Each of the inclined surfaces 62d is formed to be inclined downwardly from an end of the guide protrusion 62b towards a center in the width direction. A locking groove 62e is provided at the guide protrusion 62b. The locking groove 62e includes a configuration of a substantially U-shaped groove that is recessed forward from an intermediate portion, in the up/down direction, of a rear end surface of the guide protrusion 62b along an entire length of the guide protrusion 62b in the width direction.

The flange 62a of the up/down pin 62 is inserted in the guide opening 61a, and thus a movement of the up/down pin 62 in the up/down direction is guided. The guide protrusion 62b is fitted by insertion in the communication hole 61c, and thus the movement of the up/down pin 62 in the up/down direction is guided so that the up/down pin 62 is non-rotatable. The distal end of the coil spring 63 is pressed against and in contact with an annular lower surface, which surrounds the guide protrusion 62b, of the flange 62a, and thus the up/down pin 62 is always biased upwardly by the coil spring 63.

A coil spring 65 (i.e., a biasing member) is accommodated at an end portion of the guide hole 61b of the memory base 61. That is, the coil springs 65 are provided as a pair in this embodiment. A pair of memory pins 64 are attached to the respective end portions of the guide hole 61b to be arranged symmetrically (left-right symmetrically) in the width direction to each other. Each of the memory pins 64 includes a flange 64a having a substantially disc shape formed to match an inner circumferential surface of the guide hole 61b. Each of the memory pins 64 includes an engagement protrusion 64b which protrudes from a central portion of the flange 64a outwardly in the width direction and is inserted in the corresponding coil spring 65. Each of the engagement protrusion 64b is formed substantially in an elongated-circular column in which the elongated circle is elongated in the front/rear direction.

The flange 64a of each of the memory pins 64 is inserted in the guide hole 61b, and thus a movement, that is, advance and retract, of each of the memory pins 64 in the width direction is guided. The flange 64a of each of the memory pins 64 includes a guide surface 64c formed at an outer circumferential portion of the flange 64a. Each of the guide surfaces 64c includes a tapered configuration where a diameter of the flange 64a is reduced towards an inner-side end in the width direction. Each of the guide surfaces 64c is formed to be inclined to follow the inclination of the corresponding inclined surface 62d of the up/down pin 62 at a position at which the guide surface 64c and the inclined surface 62d are in contact with each other.

An accommodation bore 61d formed in a round shape is provided at the memory base 61. The accommodation bore 61d is positioned at a lower side portion of the communication hole 61c in the up/down direction and provides communication in the front/rear direction between a rear end surface of the memory base 61 and the communication hole 61c. An inner diameter of the accommodation bore 61d is specified to be smaller than an opening width of the communication hole 61c in the width direction. A coil spring 67 (i.e., a second biasing member) is accommodated in the accommodation bore 61d.

A plate guide hole 61e is provided at the memory base 61, at a position corresponding to a central portion of the accommodation bore 61d in the up/down direction, for providing communication in the front/rear direction, that is, penetrating the memory base 61 in the front/rear direction. The plate guide hole 61e includes a slit configuration extending in the width direction. An opening width of the plate guide hole 61e in the width direction is specified to be greater than the opening width of the communication hole 61c in the width direction. Thus, an inner wall surface of each of the communication hole 61c and the accommodation bore 61d is cut out by the plate guide hole 61e in both outward directions in the width direction so that a groove configuration is formed. A locking plate 66 (i.e., a shutter member) is inserted into the plate guide hole 61e from the front so as to be slidable relative to the plate guide hole 61e in the front/rear direction. That is, the locking plate 66 is formed in a substantially quadrangular shaped plate of which a width is equivalent to the opening width of the plate guide hole 61e in the width direction, and is fitted by insertion into the plate guide hole 61e from the front.

A through hole 66a formed in a substantially quadrangular shape is provided at a rear end portion of the locking plate 66. An opening width of the through hole 66a in the width direction is specified to be equivalent to the opening width of the communication hole 61c (a width of the guide protrusion 62b) in the width direction. An opening width of the through hole 66a in the front/rear direction is specified to be greater than an opening width of the communication hole 61c in the front/rear direction (a length of the guide protrusion 62b in the front/rear direction). A front end portion of the locking plate 66 is folded downwardly and then rearward to define a substantially bow shape, thereby forming a pushed portion 66b.

The memory base 61 includes a pair of side stop portions 61f which are provided at respective sides thereof in the width direction. Each of the side stop portions 61f is formed in a substantially quadrangular shape. Each of the side stop portions 61f is formed by being cut-out a lower portion of a central portion, in the front/rear direction, of the memory base 61 inwardly so that the pair of side stop portions 61f are arranged to face each other in the width direction. The memory base 61 further includes a rear stop hole 61g formed in a substantially quadrangular shape and provided below the accommodation bore 61d. The rear stop hole 61g provides communication between the rear end surface of the memory base 61 and the guide hole 61b in the front/rear direction.

A removal prevention plate 68 made of plate material is fixed to the memory base 61. The removal prevention plate 68 is secured at the pair of side stop portions 61f and at the rear stop hole 61g. The removal prevention plate 68 includes a top plate portion 68a arranged to be spread at an upper surface of the memory base 61. The removal prevention plate 68 includes a pair of first extending wall portions 68b extending from respective ends, in the width direction, of the top plate portion 68a downwardly along respective side surfaces, in the width direction, of the memory base 61. The removal prevention plate 68 includes a second extending wall portion 68c extending from a rear end of the top plate portion 68a downwardly along the rear end surface of the memory base 61. A distal end portion of each of the pair of first extending wall portions 68b is bent inwardly in the width direction to form a side stop tab 68d. A distal end portion of the second extending wall portion 68c is bent forward to form a rear stop tab 68e. In a state that the top plate portion 68a is in contact with the upper surface of the memory base 61, the removal prevention plate 68 is fixed to the memory base 61 in such a manner that the side stop tabs 68d are inserted in and engaged at the respective side stop portions 61f of the memory base 61 and the rear stop tab 68e is inserted in and engaged at the stop hole 61g of the memory base 61. The removal prevention plate 68 includes a width that is equivalent to the distance between the first flanges 13 of the lower rail 10 in the width direction. Thus, the memory base 61 is disposed between the first flanges 13 to be movable in the front/rear direction together with the removal prevention plate 68.

A head portion insertion hole 68f formed in a substantially quadrangular shape is provided at a central portion of the top plate portion 68a of the removable prevention plate 68. An opening width of the head portion insertion hole 68f in the width direction is specified to be equivalent to a width of the head portion 62c of the up/down pin 62 and an opening width of the head portion insertion hole 68f in the front/rear direction is specified to be equivalent to a length of the head portion 62c in the front/rear direction. The head portion 62c of the up/down pin 62 biased upwardly by the coil spring 63 is fitted by insertion in the head portion insertion hole 68f. Thus, an upward movement of the up/down pin 62 biased by the coil spring 63 is restricted because an annular upper surface, which surrounds the head portion 62c, of the flange 62a is in contact with a peripheral edge portion of the head portion insertion hole 681. That is, the removal prevention plate 68 restricts or controls an uppermost position of the up/down pin 62 and prevents the up/down pin 62 from being removed or coming off upwardly.

An insertion hole 68g formed in a substantially elongated circular shape is provided at each of the first extending wall portions 68b of the removal prevention plate 68. The engagement protrusion 64b of each of the memory pins 64 is configured to be fitted by insertion in the corresponding insertion hole 68g so as to be non-rotatable. A peripheral edge portion of each of the insertion holes 68g is pressed against and is in contact with one distal end of the corresponding coil spring 65 accommodated in the guide hole 61b, and thus the removal prevention plate 68 prevents the coil spring 65 from being removed or coming off outwardly in the width direction. An annular end surface of the flange 64a which surrounds the engagement protrusion 64b is in contact with and pressed against the other distal end of the coil spring 65, and thus each of the memory pins 64 is always biased inwardly in the width direction.

In addition, the removal prevention plate 68 is pressed against and in contact with a rear end of the coil spring 67 accommodated in the accommodation bore 61d, and thus the removal prevention plate 68 prevents the coil spring 67 from being removed or coming off rearward. The rear end portion of the locking plate 66, which moves into the plate guide hole 61e, is in contact with and pressed against a front end of the coil spring 67, and thus the locking plate 66 is always biased forward.

As illustrated in FIGS. 14A and 14B, in a state where the up/down pin 62 biased by the coil spring 63 is moved upwardly and an upper surface of the flange 62a is in contact with the peripheral edge portion of the head portion insertion hole 68f (that is, a state where the up/down pin 62 is restricted or controlled to be at the uppermost position), the head portion 62c protrudes from the removal prevention plate 68 significantly in the upper direction. At this time, an amount of ingression, that is, an amount of insertion, of the guide protrusion 62b into the guide hole 61b is small. At this time, each of the memory pin 64 is biased by the corresponding coil spring 65 inwardly in the width direction until the guide surface 64c comes in contact with the corresponding inclined surface 62d. Thus, each of the memory pin 64 is in a retracted state where the engagement protrusion 64b is retracted inwardly in the width direction relative to the removal prevention plate 68 (the first extending wall portion 68b).

In the retracted state, a lower portion of the guide protrusion 62b, which is positioned lower relative to the locking groove 62e, penetrates the communication hole 61c. The locking plate 66 biased by the coil spring 67 is restricted from moving forward because an edge portion 66c provided behind the through hole 66a is in contact with the guide protrusion 62b. Accordingly, the up/down pin 62 is allowed to move in the up/down direction inside the guide opening 61a and the communication hole 61c (and the through hole 66a of the locking plate 66).

As illustrated in FIG. 5, in the accommodated state, the memory piece 60 is movable in the front/rear direction integrally with the upper rail 15 without causing interference between each of the memory pins 64 and the corresponding first flange 13 of the lower rail 10. Specifically, in a state where the relative movement of the upper rail 15 relative to the lower rail 10 is restricted by the lock lever 23, one of the plural lock holes 13a of each of the first flanges 13 opens at an outer side of the corresponding memory pin 64 in the width direction, that is, one of the plural lock holes 13a of each of the first flanges 13 is positioned to face the corresponding memory pin 64 in the width direction.

Figure 15A:
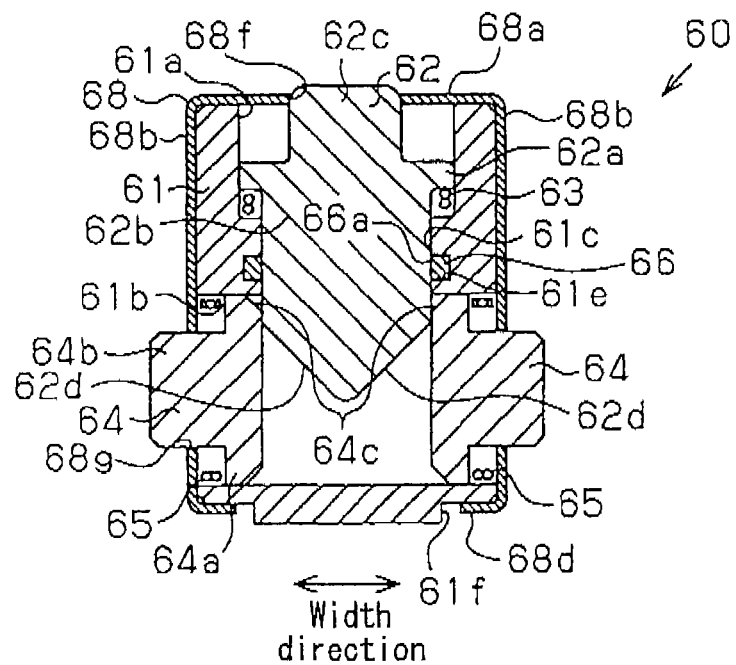
FIG. 15A a transverse sectional view of the memory piece in a state where the memory pin protrudes outward in the width direction according to the first embodiment.
Figure 15B:
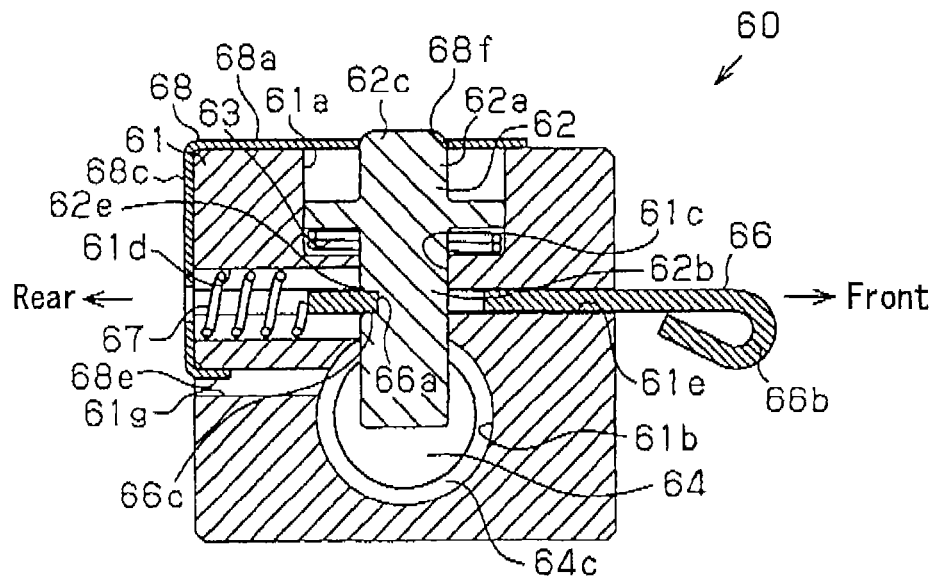
FIG. 15B a longitudinal sectional view of the memory piece in the state where the memory pin protrudes outward in the width direction.

On the other hand, as illustrated in FIGS. 15A and 15B, in a state where the up/down pin 62 is moved downwardly against the biasing force of the coil spring 63, and the edge portion 66c, which is at a rear side relative to the through hole 66a of the locking plate 66 biased by the coil spring 67, fits in the locking groove 62e in association with the downward movement of the up/down pin 62, the distal end portion of the guide protrusion 62b moves into the guide hole 61b significantly. As a result, the guide surface 64c of each of the memory pins 64 is pushed by the corresponding inclined surface 62d of the guide protrusion 62b, and thus the memory pin 64 is guided by the inclined surface 62d and is moved outwardly in the width direction against the biasing force of the corresponding coil spring 65. Each of the engagement protrusion 64b passes through the corresponding insertion hole 68g of the removal prevention plate 68 (the first extending wall portion 68b) and protrudes outwardly in the width direction relative to the removal prevention plate 68.

Figure 11:
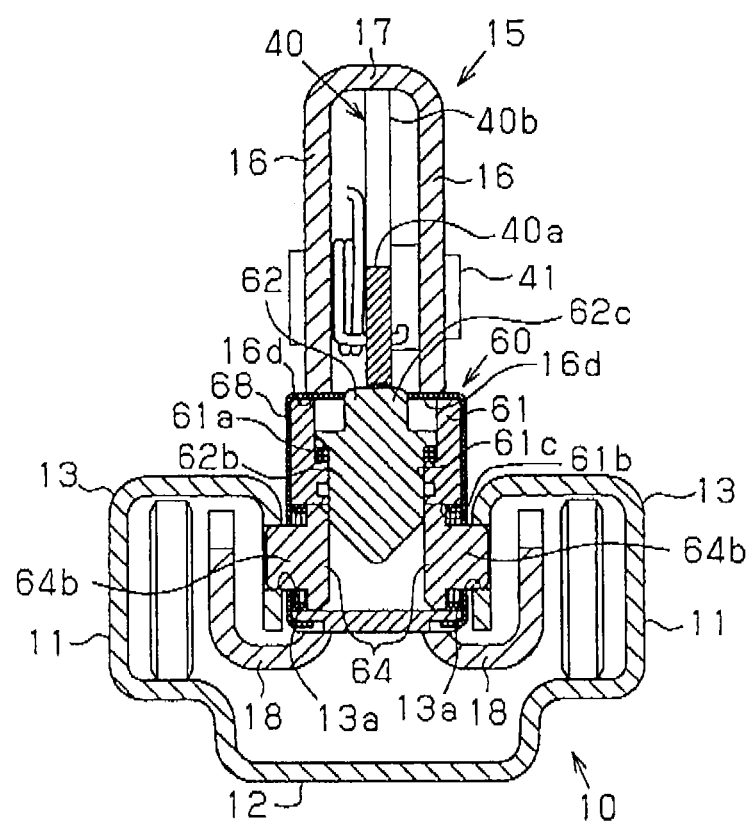
FIG. 11 is a cross-sectional view taken along line XI-XI in FIG. 9.

As illustrated in FIG. 11, the engagement protrusions 64b of the respective memory pins 64 fit in the corresponding lock holes 13a of the first flanges 13, and thus the memory piece 60 is fixed to or secured at the lower rail 10 and is restricted from moving in the front/rear direction relative to the lower rail 10. As described above, the restriction on the relative movement which is applied by the lock lever 23 is achieved with the use of the lock holes 13a arranged at the inner side without using the lock holes 13a arranged at the outer side. Accordingly, it may be understood that the lock holes 13a which are arranged at the outer side are provided for the purpose of receiving the engagement protrusion 64b of the memory pin 64 at the outer side. However, providing the lock holes 13a at first flanges 13 at both sides, that is, at the inner and outer sides, is effective in enhancing versatility of the lower rail 10.

Specifically, the engagement protrusion 64b formed in a substantially elongated-circular column is in contact with or is close to the four sides of the lock hole 13a formed in the substantially rectangular shape, and thus the engagement protrusion 64b is prevented from rotating relative to the first flange 13. That is, the memory pins 64 of the memory piece 60 are supported by the removal prevention plate 68 to be non-rotatable, and the memory pins 64 are fitted by insertion in the corresponding lock holes 13a. As a result, the memory piece 60 is secured at the lower rail 10 to be non-rotatable relative thereto.

As illustrated in FIG. 4, a stopper member 32 made of plate material and formed substantially in a shape of a letter L is fixedly attached to the upper rail 15, at a front side relative to the accommodation portion S. A rear portion of the stopper member 32 opposes the locking plate 66, and the stopper member 32 is in contact with the locking plate 66 (the pushed portion 66b) in a case where the stopper member 32 moves rearward together with the upper rail 15. The stopper member 32 constitutes a holding member together with the locking plate 66 and the coil spring 67. Specifically, in a state where the memory piece 60 is accommodated in the accommodation portion S, the stopper member 32 causes the locking plate 66 to move rearward against the biasing force of the coil spring 67. Thus, the up/down pin 62 is allowed to move in the up/down direction. That is, the restriction on the movement of the up/down pin 62 in the up/down direction, which is associated with the forward movement of the locking plate 66, is achieved by the movement of the stopper member 32 together with the upper rail 15 in the front direction relative to the locking plate 66.

Figure 6:
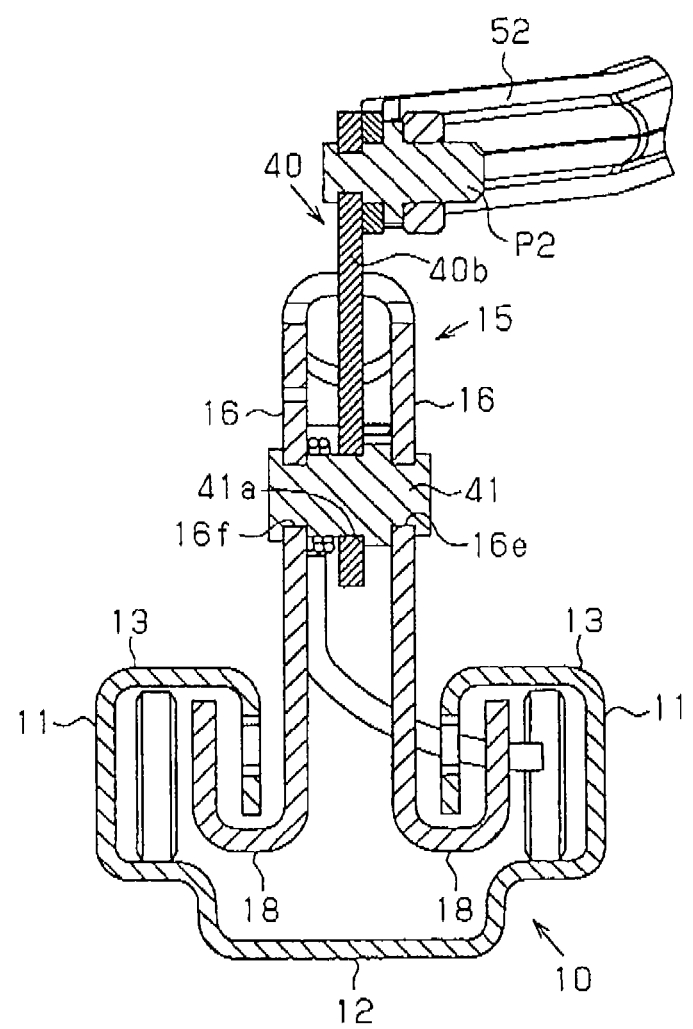
FIG. 6 is a cross-sectional view taken along line VI-VI in FIG. 4.

As illustrated in FIGS. 1 and 4, a memory link 40 made of, for example, plate material is rotatably connected to the upper rail 15, at a rear side relative to the lock lever 23. As illustrated in FIG. 6, first and second bearing bores 16e, 16f each formed in a circular shape to be concentric with each other are provided at the respective second vertical wall portions 16, at a rear side relative to the first and second through holes 16a and 16b. Each of the first and second bearing bores 16e and 16f is formed so that communication is provided therebetween in the width direction. End portions of a support shaft 41, which is formed in a substantially circular column including a step portion, are inserted in the respective first and second bearing bores 16e and 16f and fastened thereat. The support shaft 41 includes an axial line extending in the width direction and a step portion 41a provided at a central portion in a long-side direction of the support shaft 41. At a portion of the support shaft 41 which is closer to the second bearing bore 16f relative to the step portion 41a, a diameter of the support shaft 41 is reduced. The portion of the support shaft 41 which is closer to the second bearing bore 16f relative to the step portion 41a is inserted in the memory link 40, and thus the memory link 40 is supported to be rotatable about the support shaft 41.

As illustrated in FIG. 4, the memory link 40 includes an operation piece 40a formed substantially in a shape of a letter L and an attachment piece 40b formed substantially in a shape of a letter I. The operation piece 40a is formed to extend in a radial direction relative to the support shaft 41, obliquely rearward in an upper direction. The attachment piece 40b is formed to extend upwardly in the radial direction with respect to the support shaft 41. An insertion hole 15A formed in a substantially quadrangular shape is provided at the upper rail 15 for leading the attachment piece 40b of the memory link 40 in the upper direction.

The memory link 40 includes a distal end portion 40c bent obliquely rearward in a lower direction relative to the operation piece 40a. In the counterclockwise direction with respect to the support shaft 41 in FIG. 4, the distal end portion 40c is opposed the up/down pin 62 of the memory piece 60 accommodated in the accommodation portion S. Thus, as shown in the change from the state illustrated in FIG. 4 to a state illustrated in FIG. 10, in a case where the memory link 40 rotates about the support shaft 41 in the counterclockwise direction in FIG. 4, the distal end portion 40c of the operation piece 40a pushes or presses the up/down pin 62. As a result, the up/down pin 62 moves downwardly against the biasing force of the coil spring 63.

A torsion coil spring 42 is wound around the support shaft 41. One end of the torsion coil spring 42 is engaged and locked at the memory link 40 while the other end of the torsion coil spring 42 is engaged and locked at the second vertical wall portion 16 of the upper rail 15. The torsion coil spring 42 biases the memory link 40 so that the memory link 40 rotates in the clockwise direction in FIG. 4. It is configured that the memory link 40 is held at an initial rotation position by the biasing force of the torsion coil spring 42, at which the up/down pin 62 is released.

One end 43a of a first release cable 43 is engaged and locked at the attachment piece 40b of the memory link 40. The first release cable 43 extends rearward from the attachment piece 40b and the other end of the first release cable 43 is connected to the seatback 7. When the seatback 7 is in the forward-folded state, that is, the seatback 7 is folded forward so as to be tilted in the forward direction relative to the seat cushion 6 of the seat 5, the attachment piece 40b is pulled by the first release cable 43 in the rearward direction to thereby rotate the memory link 40 in the counterclockwise direction in FIG. 4 (which will be referred to also as "a release direction") about the support shaft 41 against the biasing force of the torsion coil spring 42. At this time, the up/down pin 62 pushed by the distal end portion 40c of the operation piece 40a moves downwardly against the biasing force of the coil spring 63 as described above.

Figure 7:
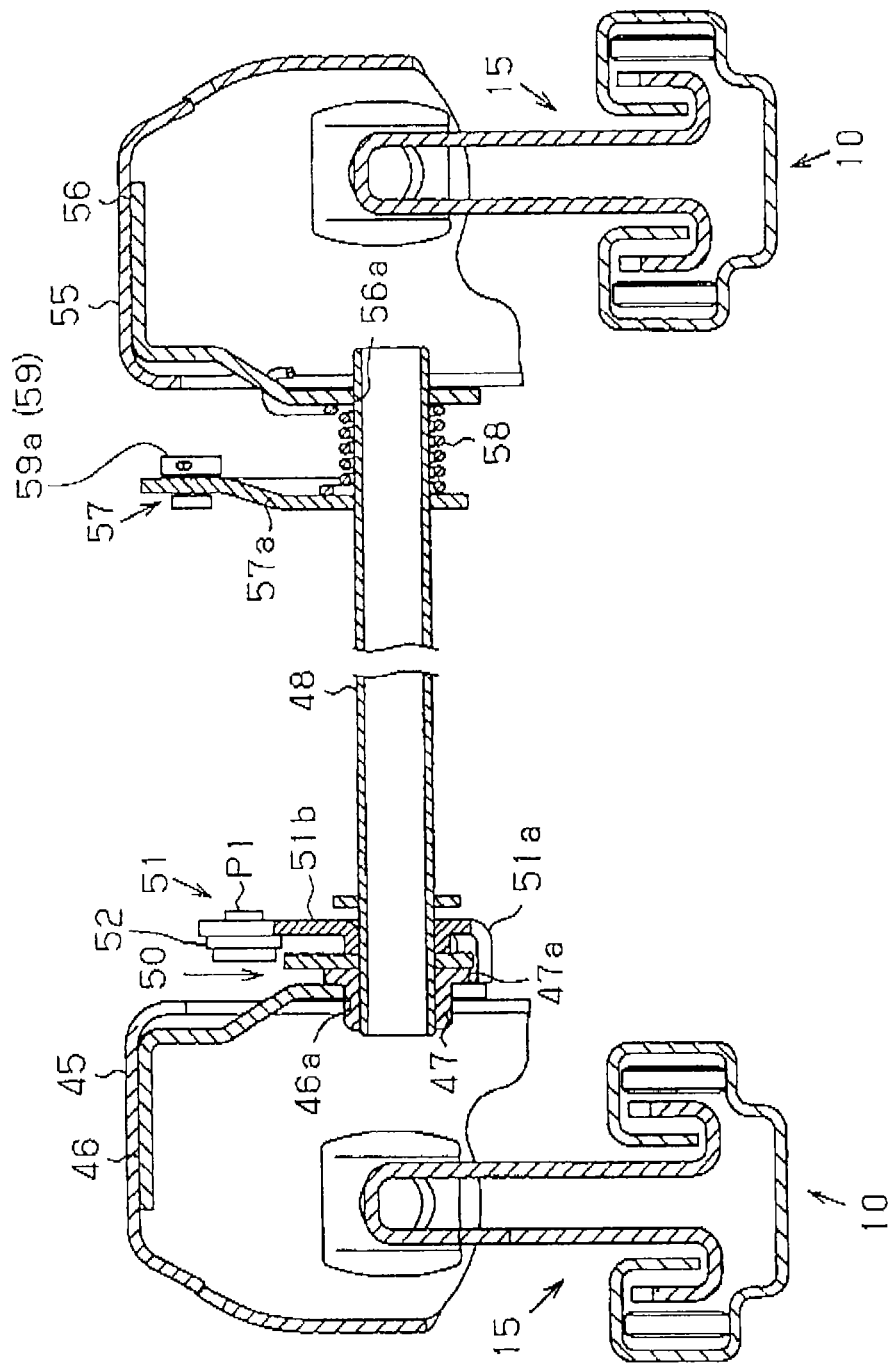
FIG. 7 is a cross-sectional view taken along line VII-VII in FIG. 2.

As illustrated at a left side in FIG. 7, a support frame 45 formed in a shape of a substantially quadrangular frame opening downwardly and inwardly is secured or fastened to an upper portion of the upper rail 15. The seat 5 is supported via the support frame 45 by the upper rail 15. A support bracket 46 made of, for example, plate material is fixed to the support frame 45 by being inserted through the opening of the support frame 45 which opens inwardly. A bearing bore 46a formed in a circular shape and opening in the width direction is provided at a wall portion, which is arranged to extend substantially along the up/down direction, of the support bracket 46. A rotary shaft 47 which is formed in a substantially cylindrical shape including a flange and whose axial line extends in the width direction is inserted in the bearing bore 46a and is supported thereat. At this time, a flange 47a of the rotary shaft 47 is in contact with a peripheral edge portion of the bearing bore 46a, and thus the rotary shaft 47 is restricted from moving outwardly (towards the upper rail 15). One end portion of a connecting bar 48 which is formed in a substantially cylindrical shape and whose axial line extends in the width direction is inserted in the rotary shaft 47 and is fixed thereto.

Figure 8:
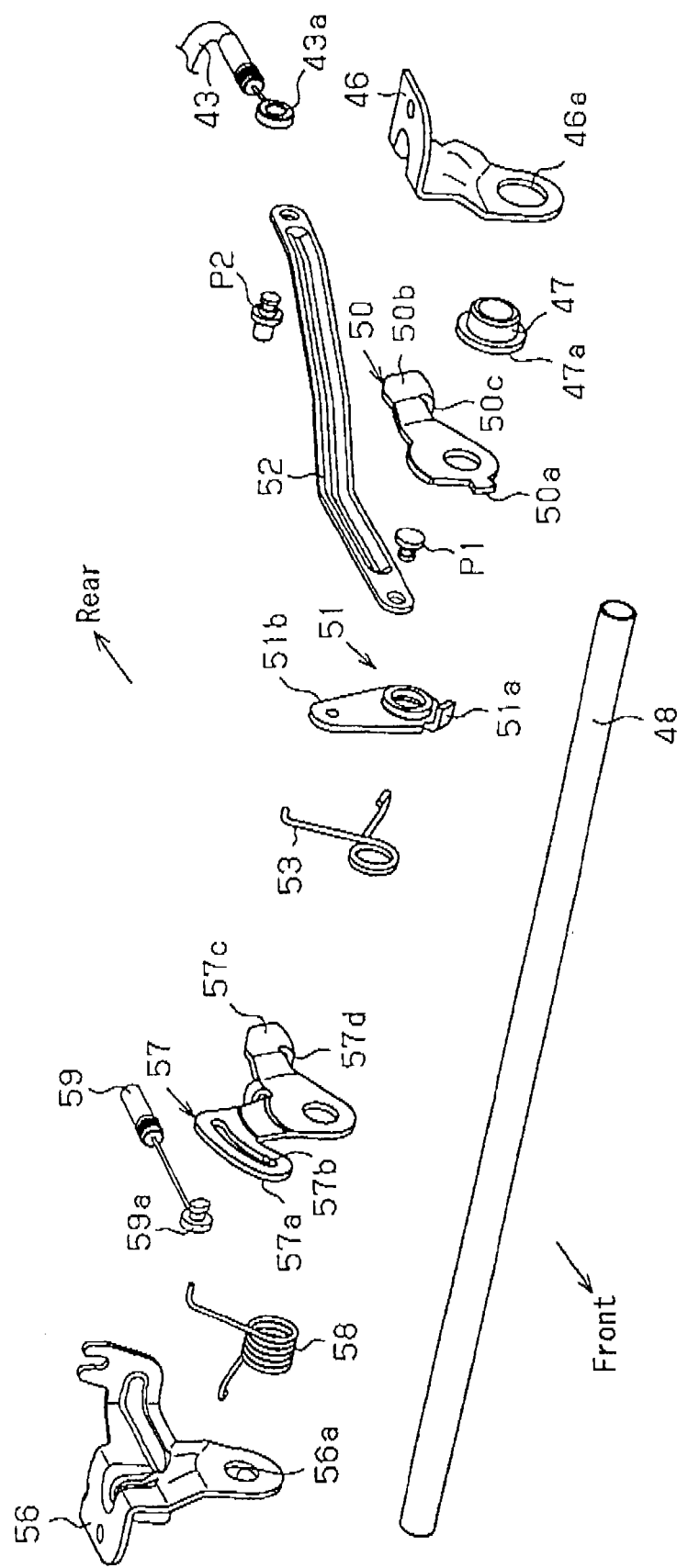
FIG. 8 is an exploded perspective view illustrating the first embodiment.

As illustrated in FIGS. 7 and 8, a first release lever 50 made of, for example, plate material is fixed to the connecting bar 48 to be rotatable integrally with the connecting bar 48. The first release lever 50 is arranged at the inner side relative to the rotary shaft 47 (the flange 47a) to be adjacent thereto. The first release lever 50 includes a pushed piece 50a, a protruding piece 50b and a pushing piece 50c. The pushed piece 50a is substantially formed in a shape of a tab and radially extends relative to the connecting bar 48 in a front direction. The protruding piece 50b is formed to radially extend in a rearward direction. The pushing piece 50c is formed to radially extend from a lower end of a distal end portion of the protruding piece 50b towards the inner side. As illustrated in FIG. 3, the pushing piece 50c opposes or faces the input portion 23c of the lock lever 23 in the up/down direction. Thus, in a case where the first release lever 50 rotates together with the connecting bar 48 in a direction in which the pushing piece 50c moves downwardly, the input portion 23c of the lock lever 23 is pushed or pressed by the pushing piece 50c. As a result, the lock lever 23 releases the restriction on the relative movement between the lower rail 10 and the upper rail 15 in the above-described manner.

A lever member 51 made of, for example, plate material is rotatably supported at the connecting bar 48. The lever member 51 is arranged at the inner side relative to the first release lever 50 to be adjacent thereto. The lever member 51 includes a pushing piece 51a and an attachment piece 51b. The pushing piece 51a is formed substantially in a shape of a letter L extending forward in a radial direction relative to the connecting bar 48. The attachment piece 51b is formed to extend in the radial direction relative to the connecting bar 48, obliquely forward in an upper direction.

As illustrated in FIG. 2, the pushing piece 51a of the lever member 51 is arranged at a lower side relative to the pushed piece 50a of the first release lever 50. Thus, in association with the rotation of the lever member 51 about the connecting bar 48 in the counterclockwise direction in FIG. 2 (which will be referred to also as "a release direction"), the pushing piece 51a is configured to push or press the pushed piece 50a. A front end portion of a connecting link 52 extending in the front/rear direction is rotatably connected to the attachment piece 51b with a pin P1. A rear end portion of the connecting link 52 is rotatably connected to the attachment piece 40b of the memory link 40 together with the one end 43a of the first release cable 43 by means of a pin P2. In a case where the seatback 7 is folded forward, the memory link 40 rotates in the counterclockwise direction in FIG. 2, and thus the lever member 51 is pulled by the connecting link 52 and rotates in a release direction. The lever member 51, together with the first release lever 50, constitutes a release lever. In addition, the lever member 51 constitutes an interlocking mechanism together with the first release lever 50, the memory link 40 and the connecting link 52.

A torsion coil spring 53 is wound around the connecting bar 48 to be adjacent to the lever member 51 at the inner side relative to the lever member 51. One end of the torsion coil spring 53 is engaged and locked at the second vertical wall portion 16, and the other end of the torsion coil spring 53 is engaged and locked at the lever member 51, and thus the torsion coil spring 53 biases the lever member 51 so that the lever member 51 rotates in the clockwise direction in FIG. 2. It is configured that the lever member 51 is held at an initial rotation position by the biasing force of the torsion coil spring 53.

Next, peripheral configurations of the other of the lower rails 10 in the pair, and the like, provided at the other side (i.e., a second side) of the seat 5 in the width direction will be explained. At the second side, the memory piece 60 is not provided, and the memory link 40, the lever member 51, for example, are not provided.

As illustrated at a right side in FIG. 7, a support frame 55 formed in a shape of a substantially quadrangular frame opening downwardly and inwardly is secured or fastened to an upper portion of the upper rail 15. The seat 5 is supported at the upper rail 15 via the support frame 55. A support bracket 56 made of plate material, for example, is fixed to the support frame 55 by being inserted through the opening of the support frame 55 which opens inwardly. The support bracket 56 includes a wall portion which extends substantially along the up/down direction and at which a bearing bore 56a formed in a circular shape and opening in the width direction is provided. The bearing bore 56a is arranged to be concentric with the bearing bore 46a of the support bracket 46. The other end portion of the connecting bar 48 is inserted in the bearing bore 56a and supported thereat.

As illustrated in FIGS. 7 and 8, a second release lever 57 made of plate material, for example, is fixedly attached to the connecting bar 48 so as to be integrally rotatable with the connecting bar 48. The second release lever 57 is arranged adjacent to the support bracket 56 at the inner side relative thereto in the width direction. The second release lever 57 includes an attachment piece 57a formed substantially in a shape of a letter L extending in a radial direction relative to the connecting bar 48, obliquely forward in an upper direction. An elongated hole 57b is provided at a distal end portion of the attachment piece 57a so as to be extended or elongated in a circumferential direction relative to the connecting bar 48. In addition, the second release lever 57 includes a protruding piece 57c formed to extend in the rearward direction and a pushing piece 57d formed to extend from a lower end of a distal end portion of the protruding piece 57c to the outer side in the width direction. In a similar manner to that the pushing piece 50c of the first release lever 50 opposes the input portion 23c of the lock lever 23 provided at the first side, the pushing piece 57d opposes, in the up/down direction, the input portion 23c of the lock lever 23 provided at the second side. Accordingly, in a case where the second release lever 57 rotates together with the connecting bar 48 in the direction in which the pushing piece 57d is lowered, that is, moves downwardly, the lock lever 23 of which the input portion 23c is pushed by the pushing piece 57d releases the restriction on the relative movement between the lower rail 10 and the upper rail 15 in the above-described manner.

Figure 16:
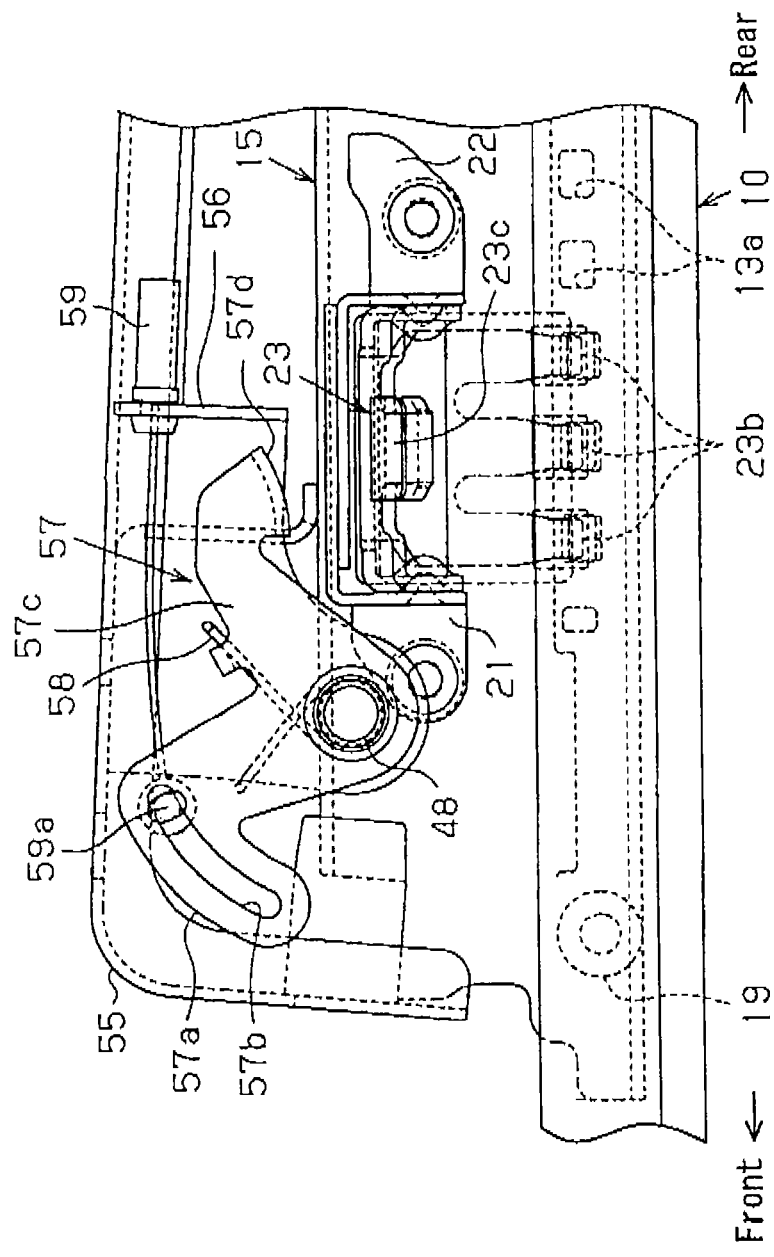
FIG. 16 is a side view illustrating the first embodiment.

As illustrated in FIGS. 8 and 16, a torsion coil spring 58 is wound around the connecting bar 48, at a portion of the connecting bar 48 between the support bracket 56 and the second release lever 57. One end of the torsion coil spring 58 is engaged and locked at the support bracket 56 while the other end of the torsion coil spring 58 is engaged and locked at the second release lever 57. The torsion coil spring 58 biases the second release lever 57 towards a rotation direction (the counterclockwise direction in FIG. 16) in which the pushing piece 57d releases the lock lever 23 (the input portion 23c). The second release lever 57 biased by the torsion coil spring 58 is held at a predetermined rotation position (which will be referred to also as "a standby position") at which the pushing piece 57d releases the lock lever 23 (the input portion 23c).

In a similar manner, as illustrated in FIG. 2, the first release lever 50 connected to the second release lever 57 via the connecting bar 48 so as to rotate integrally with the second release lever 57 is also held at a predetermined rotation position (which will be referred to also as "a standby position") at which the pushing piece 50c releases the lock lever 23 (the input portion 23c), that is, the pushing piece 50c is separated from the lock lever 23 (the input portion 23c). At this time, the pushed piece 50a of the first release lever 50 is in contact with or is close to the pushing piece 51a of the lever member 51. That is, the first and second release levers 50 and 57 are held at the respective standby positions by the common torsion coil spring 58.

As illustrated in FIG. 16, one end 59a of a second release cable 59 is inserted to the elongated hole 57b in a manner to be inhibited from disengaging from the elongated hole 57b. The second release cable 59 extends in the rearward direction from the attachment piece 57a. The other end of the second release cable 59 is connected to a release handle for a manual operation. In a case where a release operation is performed at the release handle, the attachment piece 57a is pulled by the second release cable 59 in the rearward direction. As a result, the second release lever 57 rotates from the standby position and the first release lever 50 that integrally rotates with the connecting bar 48 also rotates from the standby position.

Next, operations of the seat slide apparatus according to the first embodiment will be explained. As illustrated in FIGS. 2 and 16, in a case where the seatback 7 is not folded forward and the release handle is not operated, the first and second release levers 50 and 57 are held at the respective standby positions so that each of the lock levers 23 that is released from each of the first and second release levers 50 and 57 rotates by the biasing force of the lock spring 25 in the direction where the input portion 23c is lifted up, i.e., where the lock protrusions 23b are inserted to be positioned within the respective lock holes 13a, for example. Accordingly, the relative movement between the lower rails 10 and the upper rails 15 is restricted or locked in the above-described manner. The position of the seat 5, which is supported by the upper rails 15, in the front/rear direction is maintained.

As illustrated in FIG. 5, the memory piece 60 accommodated in the accommodation portion S is in a state where the up/down pin 62 protrudes upwardly from the memory base 61 due to the biasing force of the coil spring 63 and each of the memory pins 64 is retracted inwardly in the width direction relative to the memory base 61 (the removal prevention plate 68) due to the biasing force of the corresponding coil spring 65. Accordingly, the upper rail 15 is restricted by the lock lever 23 from moving relative to the lower rail 10 in the above-described manner, and also the memory piece 60 is restricted from moving. At this time, one of the plural lock holes 13a of each of the first flanges 13 opens at the outer side of the corresponding memory pin 64 in the width direction. In other words, at this time, the memory pin 64 faces the lock hole 13a that is away in the rearward direction for a predetermined distance (a distance corresponding to a multiple of a distance between the adjacent lock holes 13a, that is, the distance corresponding to the multiple of a locking pitch of the lock lever 23) from the lock holes 13a which the lock protrusions 23b of the lock lever 23 are inserted in and engaged at. Accordingly, the lock holes 13a are provided continuously up to positions that are farther away in the rearward direction for the predetermined distance or longer from the lock holes 13a which the lock protrusions 23b are inserted in and engaged at in a case where the upper rail 15 is at a rearmost position where the restriction imposed by the lock lever 23 on the relative movement is applicable.

Figure 17:
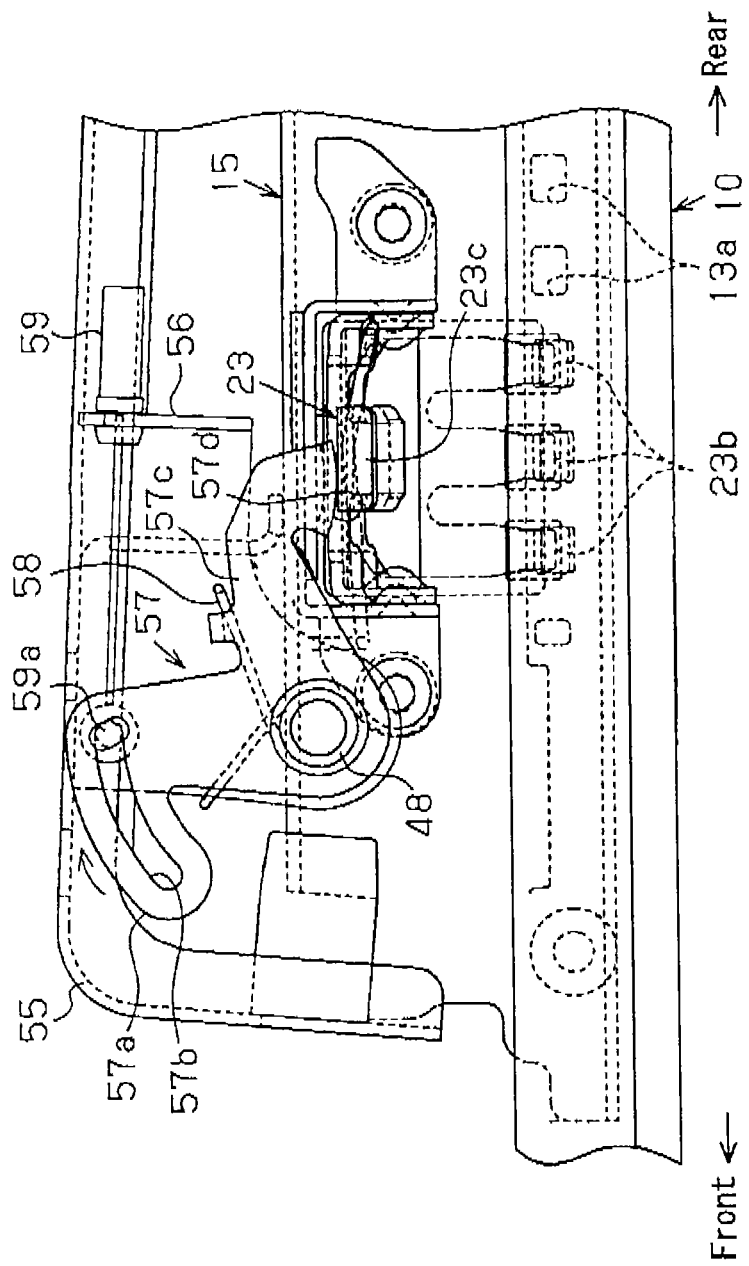
FIG. 17 is a side view illustrating the state where the restriction on the relative movement is released in association with the operation of the release handle.

In the above-described state, in a case where the release operation is performed at the release handle, the attachment piece 57a of the second release lever 57 is pulled rearward via the second release cable 59 as shown in a change from the state illustrated in FIG. 16 to a state illustrated in FIG. 17. At this time, the input portion 23c of the lock lever 23 at the second side is pushed by the pushing piece 57d of the second release lever 57 rotating from the standby position and the lock lever 23 rotates in a direction in which the input portion 23c is lowered against the biasing force of the lock spring 25, that is, in a direction in which the lock protrusions 23b disengage from, for example, the corresponding lock holes 13a.

Figure 9:
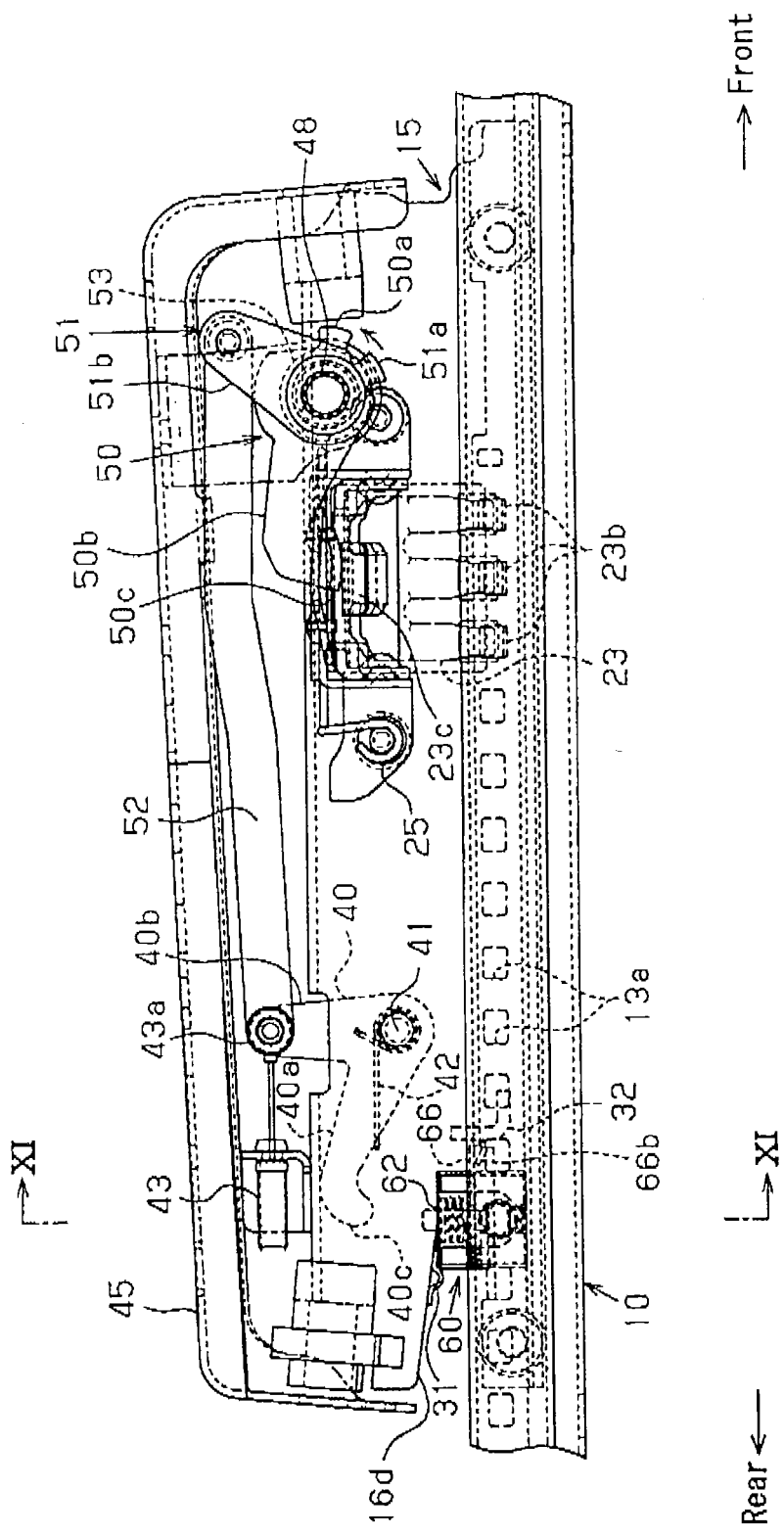
FIG. 9 is a side view illustrating a state where a restriction imposed on a relative movement of an upper rail relative to a lower rail is released in association with an operation of a release handle.

As shown in a change from the state illustrated in FIG. 2 to a state illustrated in FIG. 9, the first release lever 50 connected to the second release lever 57 via the connecting bar 48 rotates from the standby position. Thus, the lock lever 23 of which the input portion 23c is pushed by the pushing piece 50c of the first release lever 50 rotates in the direction in which the input portion 23c is lowered against the biasing force of the lock spring 25, that is, in the direction in which the lock protrusions 23b disengage from the corresponding lock holes 13a, for example. The lever member 51 rotatably supported at the connecting bar 48 remains in the initial rotation position while allowing the connecting bar 48 to rotate in an idle manner.

As described above, the restriction on the relative movement between the lower rail 10 and the upper rail 15 is released. Thus, the position of the seat 5 supported by the upper rail 15 is adjustable in the front/rear direction. In a case where the upper rail 15 moves in the front/rear direction relative to the lower rail 10, the memory piece 60 accommodated in the accommodation portion S of the upper rail 15 moves integrally with the upper rail 15 in the front/rear direction. That is, in a case where the seatback 7 is not in the forward-folded state and the upper rail 15 is moved in the front/rear direction by the operation of the release handle, the memory piece 60 moves integrally with the upper rail 15 in the front/rear direction without interfering with the first flanges 13, for example.

Figure 10:
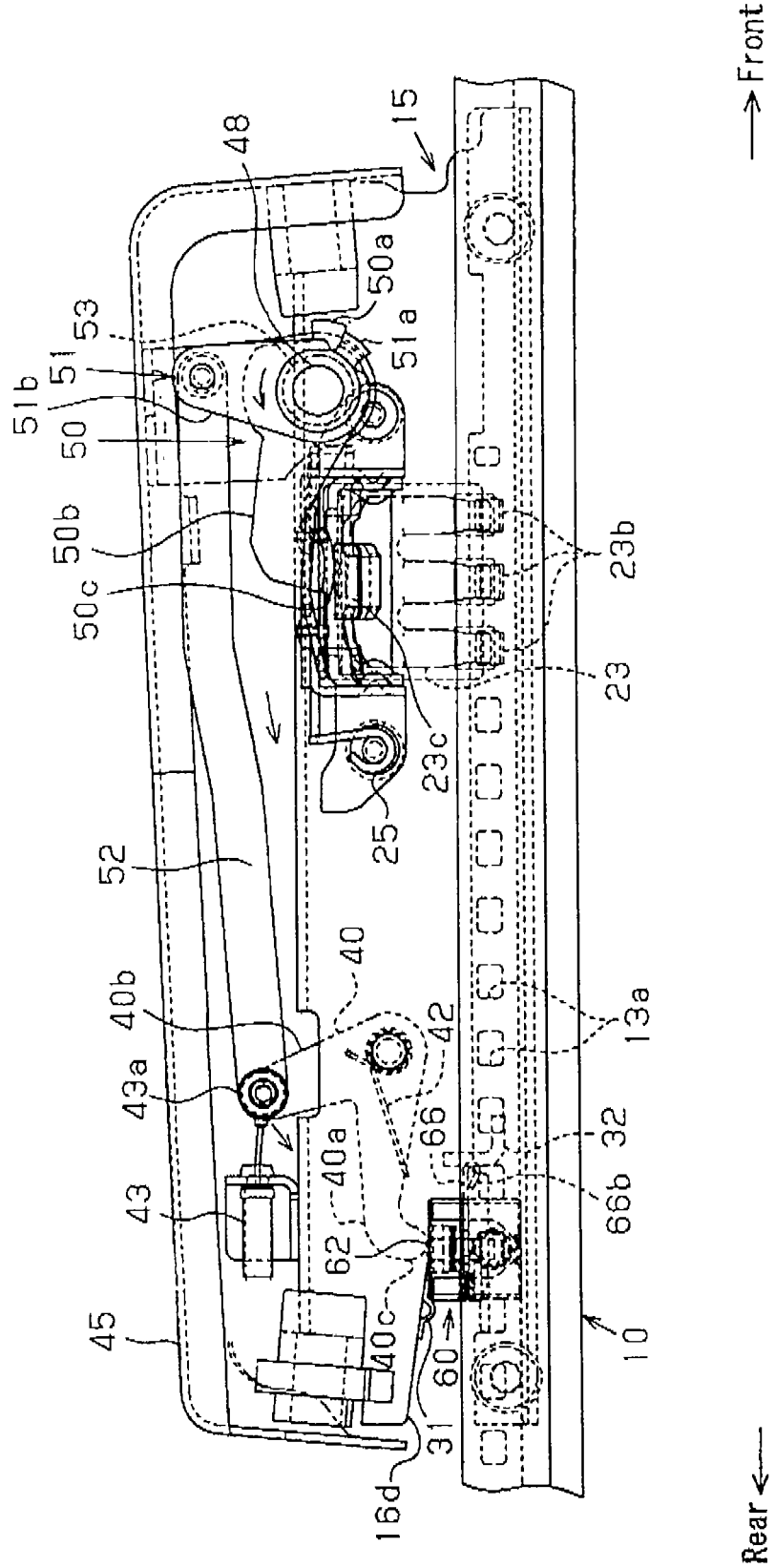
FIG. 10 is a side view illustrating the state where the restriction on the relative movement is released in association with forward-folding of a seatback.

On the other hand, in a case where the seatback 7 is folded forward, the connecting link 52, together with the attachment piece 40b of the memory link 40, is pulled rearward via the first release cable 43 as shown in a change from a state illustrated in FIG. 2 to the state illustrated in FIG. 10. In association with this, the attachment piece 51b of the lever member 51 is pulled rearward, and thus the lever member 51 rotates in a release direction. The first release lever 50 of which the pushed piece 50a is pushed by the lever member 51 (the pushing piece 51a) rotates from the standby position. Thus, against the biasing force of the lock spring 25, the lock lever 23 at the first side whose the input portion 23c is pushed by the pushing piece 50c rotates in the direction in which the input portion 23c is lowered, that is, in the direction in which the lock protrusions 23b disengage from the corresponding lock holes 13a, for example.

Figure 18:
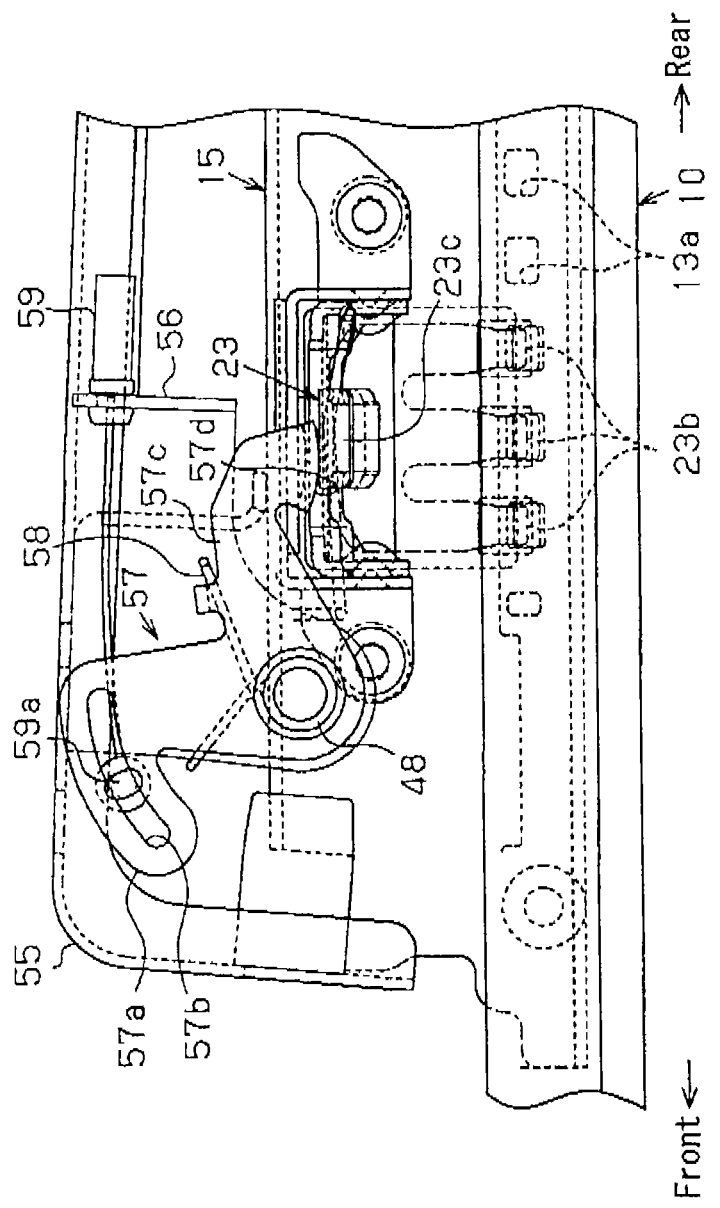
FIG. 18 is a side view illustrating the state where the restriction on the relative movement is released in association with the forward-folding of the seatback.

As shown in a change from the state illustrated in FIG. 16 to a state illustrated in FIG. 18, also the second release bar 57 connected to the first release lever 50 via the connecting bar 48 rotates from the standby position. Thus, the lock lever 23 at the second side whose input portion 23c is pushed by the pushing piece 57d of the second release lever 57 rotates in the direction in which the input portion 23c is lowered against the biasing force of the lock spring 25, that is, in the direction in which the lock protrusions 23b disengage from the corresponding lock holes 13a, for example. The second release lever 57 of which the elongated hole 57b receives therein the one end 59a of the second release cable 59 rotates from the standby position while allowing the elongated hole 57b to move or slide relative to the one end 59a in an idle manner. Accordingly, the rotation of the second release lever 57 in association with the forward-folding of the seatback 7 is not transmitted to the release handle.

As described above, the restriction on the relative movement between the lower rail 10 and the upper rail 15 is released. A release timing of the restriction on the relative movement between the lower rail 10 and the upper rail 15 which is imposed by the lock lever 23 at the first side in association with the forward-folding of the seatback 7 is specified to be synchronized with a release timing of the restriction on the relative movement which is imposed by the lock lever 23 at the second side. As long as the seatback 7 is in the forward-folded state, each of the lock levers 23 keeps the released state of the restriction on the relative movement. That is, in the forward-folded state of the seatback 7, the upper rail 15 (the seat 5) is allowed to move forward until the movement of the upper rail 15 in the forward direction is restricted by a known stopper mechanism (which corresponds to a so-called walk-in operation).

As illustrated in FIGS. 10 and 11, in a case where the seatback 7 is folded forward and the attachment piece 40b of the memory link 40 is pulled rearward via the first release cable 43, the memory link 40 rotates in the release direction. In this state, the operation piece 40a (the distal end portion 40c) of the memory link 40 pushes the head portion 62c of the up/down pin 62 downwardly. As a result, the up/down pin 62 is lowered or moves downwardly against the biasing force of the coil spring 63, and the locking groove 62e reaches the position of the locking plate 66 in the up/down direction. Accordingly, the edge portion 66c at the rear side relative to the through hole 66a comes to be engageable with the locking groove 62e by insertion. At this time, the guide surfaces 64c are pushed by the respective inclined surfaces 62d of the up/down pin 62, and thus each of the memory pins 64 moves outwardly in the width direction against the biasing force of the corresponding coil spring 65. The engagement protrusion 64b of each of the memory pins 64 passes through the corresponding insertion hole 68g of the removal prevention plate 68 and then fits in the lock hole 13a, which faces or opposes the engagement protrusion 64b, of the first flange 13.

Figure 12:
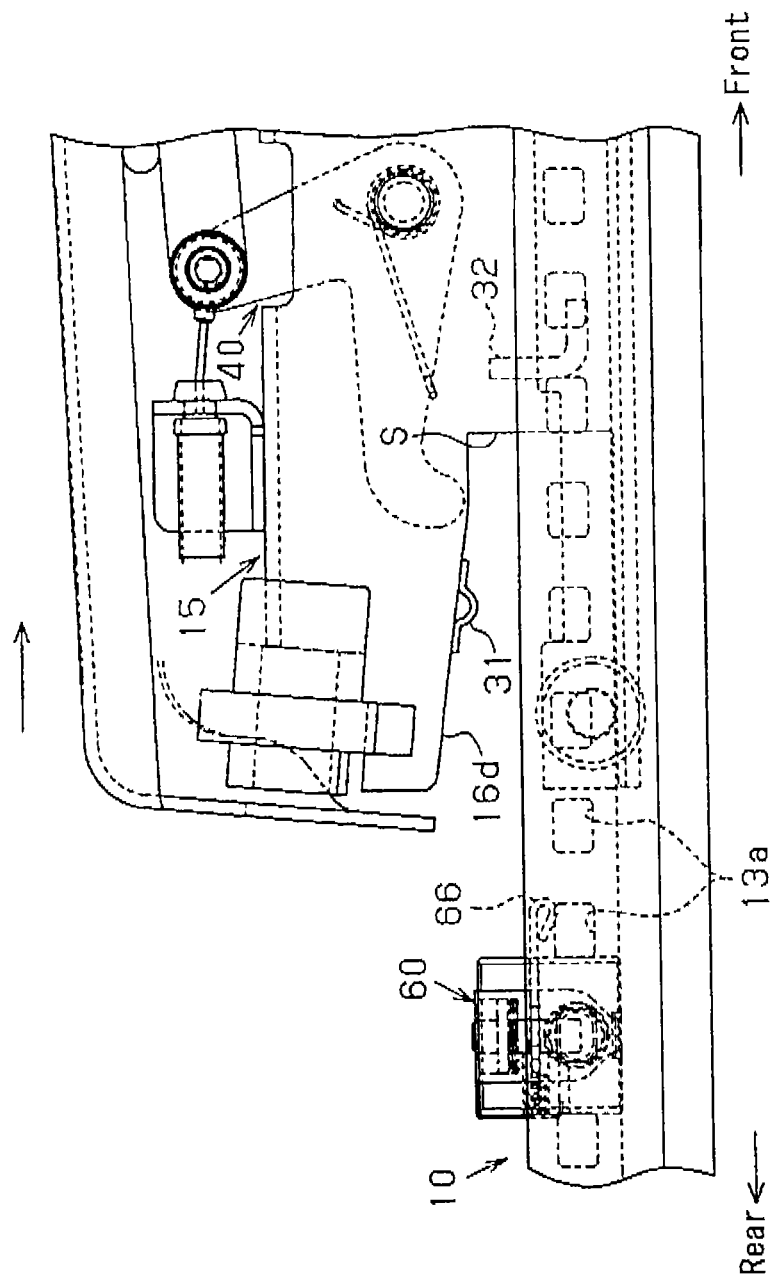
FIG. 12 is a side view illustrating a state where the upper rail is moved forward after the seatback is folded forward.

In the above-described state where the engagement protrusions 64b fit in the respective lock holes 13a of the first flanges 13 of the lower rail 10, in a case where the upper rail 15 starts moving forward, the locking plate 66 of which the pushed portion 66b is released from the stopper member 32 is biased by the coil spring 67 and thus the edge portion 66c fits in the locking groove 62e. Accordingly, the up/down pin 62 is restricted from moving in the up/down direction and each of the pair of memory pins 64 is also restricted from moving inwardly in the width direction. Thus, because the engagement protrusion 64b of each of the memory pins 64 remains fitted in the lock hole 13a, the memory piece 60 remains fixed to the lower rail 10. In a case where the upper rail 15 further moves forward, the restriction portion 31a of the restriction piece 31 passes over the memory piece 60 while being elastically deformed. Then, as illustrated in a change to a state illustrated in FIG. 12, the upper rail 15 moves forward in a state where the memory piece 60 is left, that is, remains at the position where the memory piece 60 is fixed to the lower rail 10.

That is, the restriction piece 31 (the restriction portion 31a) normally holds the memory piece 60 (the memory base 61) with the biasing force of the restriction piece 31 so that the memory piece 60 moves forward integrally with the upper rail 15. However, in a case where a load which is applied from the memory piece 60 fixed to the lower rail 10 exceeds a certain or fixed range, the restriction piece 31 passes over the memory piece 60 while the restriction piece 31 being deformed elastically.

In a state immediately before the upper rail 15 moves forward or in an arbitrary state where the upper rail 15 has moved forward, when the seatback 7 is unfolded or raised so that the forward-folded state is released, the memory link 40 returns to the initial rotation position and the first release lever 50 returns to the standby position via the connecting link 52. At the same time, the second release lever 57 returns to the standby position via the connecting bar 48. As a result, the lock levers 23 at the first and second sides are released from the pushing pieces 50c and 57d of the respective first and second release levers 50 and 57 returning to the standby positions, and thus the movement of the upper rail 15 relative to the lower rail 10 is restricted. A timing at which the restriction on the relative movement between the lower rail 10 and the upper rail 15 is applied by the lock lever 23 at the first side in association with the release of the forward-folding of the seatback 7 is specified to be synchronized with a timing at which the restriction is applied by the lock lever 23 at the second side.

On the other hand, in a case where the upper rail 15 moves forward while the seatback 7 remains in the forward-folded state and then the upper rail 15 moves rearward thereafter, a front end surface of each of the cut-outs 16d comes in contact with the memory base 61, and thus the upper rail 15 is restricted from moving rearward as shown in a change to the state illustrated in FIG. 10. That is, the upper rail 15 stops at a position (a memory position) at which the upper rail 15 is positioned immediately before the upper rail 15 moves forward in association with the forward-folding of the seatback 7. At the same time, the locking plate 66 of which the pushed portion 66b is pushed by the stopper member 32 moves rearward against the biasing force of the coil spring 67, and thus the edge portion 66c disengages from the locking groove 62e. As a result, the restriction on the movement of the up/down pin 62 in the up/down direction which is imposed by the locking plate 66 is released. However, the operation piece 40a of the memory link 40 moves into a position above the up/down pin 62 instead, and the up/down pin 62 is restricted from moving upwardly by the operation piece 40a.

Thereafter, in a case where the seatback 7 is unfolded so that the forward-folded state is released, as shown in changes to the states illustrated in FIG. 4 and FIG. 16, the memory link 40 rotates about the support shaft 41 in the clockwise direction in FIG. 4 to return to the initial rotation position, and the first release lever 50 and the second release lever 57 return to the respective standby positions.

In association with the return of the first and second release levers 50 and 57 to the respective standby positions, the lock levers 23 released from the respective first and second release levers 50 and 57 (the pushing pieces 50c and 57d) restrict the upper rail 15 from moving relative to the lower rail 10. The timing of the restriction on the relative movement between the lower rail 10 and the upper rail 15 which is imposed by the lock lever 23 at the first side in association with the release of the forward-folding of the seatback 7 is specified to be synchronized with the timing of the restriction on the relative movement which is imposed by the lock lever 23 at the second side. At the same time, the up/down pin 62 released from the operation piece 40a of the memory link 40 moves upwardly and each of the memory pins 64 moves inwardly in the width direction to retract inside the memory base 61. As a result, the memory piece 60 releases the engagement between the memory piece 60 and the lower rail 10.

As described above, in a case where the upper rail 15 moves forward (in the front direction of the seat) in association with the forward-folding of the seatback 7, and thereafter the upper rail 15 moves in the rear direction of the seat, the state before the movement of the upper rail 15 is retrieved via the release of the forward-folding of the seatback 7.

Specifically, the memory function is achieved or implemented in a state where the memory piece 60 (the memory base 61) is left or remains above the bottom wall portion 12 regardless of the state of the memory pins 64. As described in detail above, according to the present embodiment, the following effects are obtained.

(1) According to the present embodiment, the memory function is achieved in a state where the memory base 61 is arranged above the bottom wall portion 12 of the lower rail 10 regardless of the states of the respective memory pins 64, and thus a restriction or constraint by the lower rail 10 is reduced. For example, in order to fixedly attach the lower rail 10 to the vehicle floor 1 or to an appropriate bracket, in a case where plural fasteners provided at the lower rail 10 to be arranged spaced away from one another in the front/rear direction are used, a head portion of each of the fasteners protrudes above the bottom wall portion 12. However, according to the present embodiment, the memory base 61 (the memory piece 60) is always positioned above the bottom wall portion 12. Accordingly, the memory function is achieved without being influenced by such a fixing structure of the lower rail 10.

(2) According to the present embodiment, the memory pins 64 (the engagement protrusions 64b) are fitted, by insertion, in the lock holes 13a which are related to the selective restriction on the relative movement between the lower rail 10 and the upper rail 15 relative to each other. That is, the lock holes 13a related to the selective restriction on the relative movement are utilized also for receiving therein the memory pins 64. As a result, workload for the machining of the lower rail 10 is reduced.

In addition, a strength of the lower rail 10 is restricted from decreasing. Such a decrease in the strength of the lower rail occurs in a case where fitting recessed portions, in which the memory pins 64 (the engagement protrusions 64b) are inserted and fitted, are formed at each of the first flanges 13 of the lower rail 10 independently of, that is, separately from, the lock holes 13a, for example.

(3) According to the present embodiment, when the memory pins 64 are in a protruding state where the memory pins 64 protrude from the memory base 61 outwardly in the width direction, the engagement protrusions 64b are inserted in and fitted to the corresponding lock holes 13a to be non-rotatable relative thereto. Thus, the memory pins 64 are restricted, together with the memory base 61, from rotating relative to the lower rail 10. Accordingly, a posture of the memory base 61 is more stabilized in an engagement state where the memory base 61 is engaged with the lower rail 10, thereby a return operation to the memory position is more stabilized.

(4) According to the present embodiment, with an extremely simple structure constituted by the first release lever 50, the lever member 51, the memory link 40 and the connecting link 52, the lock lever 23 is pushed in the direction in which the lock lever 23 releases the restriction on the relative movement between the lower rail 10 and the upper rail 15 relative to each other, and each of the memory pins 84 is pushed so that the memory pin 64 protrudes outwardly in the width direction, in the forward-folded state of the seatback 7.

(5) According to the present embodiment, in the state that is established immediately before the upper rail 15 moves forward in association with the forward-folding of the seatback 7 or in the arbitrary state (in an arbitrary arrangement of the upper rail 15 and the lower rail 10 relative to each other between the memory position and the foremost position) where the upper rail 15 has moved forward in association with the forward-folding of the seatback 7, when the seatback 7 is unfolded so that the forward-folded state is released, the lock lever 23 is released from the memory link 40 returning to the initial rotation position, and thus the lock lever 23 restricts the relative movement of the upper rail 15 relative to the lower rail 10. That is, the relative movement of the upper rail 15 relative to the lower rail 10 may be restricted even though the relative position of the upper rail 15 relative to the lower rail 10 does not return to the memory position. Accordingly, without the return to the memory position, the seat 5 is brought to be in the state where the seat 5 is immobile in the front/rear direction when the occupant unfolds the forward-folded seatback 7 with the intention to be seated on the seat 5, for example.

(6) According to the present embodiment, for example, the memory piece 60 which is related to the return to the memory position is provided at only one side in the pairs, that is, at one of the first and second sides of the seat 5 in the width direction. Thus, as compared to a case where the memory piece 60 and the like are provided at each of the sides, the number of components is reduced.

(7) According to the present embodiment, in association with the forward-folding the seatback 7, each of the lock levers 23 at the first and second sides is operated in an interlocking manner so that the restriction on the relative movement is released.

A second embodiment of a seat slide apparatus for a vehicle will be explained with reference to the FIGS. 20, 21A to 21C, and 22A to 22C. In a configuration of the second embodiment, only the memory piece of the first embodiment is modified, and therefore detailed explanations on the features and/or structures similar to the first embodiment will be omitted.

As illustrated in FIGS. 20 and 21A to 21C, a memory piece 70 of the present embodiment includes a memory base 71, an up/down pin 72, a pair of memory pins 73, a guide pin 74 (i.e., a guide member), a removal prevention plate 75, the coil springs 63, 65, 67 and the locking plate 66.

In a similar manner to the memory base 61, the memory base 71 forms an outer shape of the memory piece 70. The memory base 71 includes a guide hole 71a formed in a substantially quadrangular shape and provided at a position corresponding the positions of the lock holes 13a in the up/down direction. The guide hole 71a is arranged below relative to the guide opening 61a. The guide hole 71a provides communication in the width direction, that is, the guide hole 71a is a through hole penetrating the memory base 71 in the width direction. The guide hole 71a is in communication with the guide opening 61a in the up/down direction via the communication hole 61c.

The up/down pin 72 having a configuration similar to the configuration of the up/down pin 62 includes a guide protrusion 72a protruding downwardly from the central portion of the flange 62a and inserted into the coil spring 63. A base end portion of the guide protrusion 72a is formed in a substantially quadrangular column to match the outer shape of the communication hole 61c. On the other hand, a pair of inclined surfaces 72b is provided at a distal end portion of the guide protrusion 72a. Each of the inclined surfaces 72b is formed to be inclined downwardly from an end of the distal end portion of the guide protrusion 72a towards a center in the width direction. A groove portion 72c is provided at the distal end portion of the guide protrusion 72a. The groove portion 72c includes a configuration of a substantially U-shaped groove that is recessed upwardly from a distal end surface of a central portion, in the front/rear direction, of the guide protrusion 72a.

The flange 62a of the up/down pin 72 is inserted in the guide opening 61a, and thus a movement of the up/down pin 72 in the up/down direction is guided. The guide protrusion 72a is fitted by insertion in the communication hole 61c, and thus the movement of the up/down pin 72 in the up/down direction is guided in a state that the up/down pin 72 is non-rotatable. The up/down pin 72 is always biased upwardly by the coil spring 63.

The memory pins 73 are attached to the guide hole 71a of the memory base 71 to be arranged symmetrically (left-right symmetrically) to each other in the width direction. The coil springs 65 are accommodated in the guide hole 71a. Each of the memory pins 73 includes a flange 73a having a substantially quadrangular column shape formed to match an inner wall surface of the guide hole 71a. Each of the memory pins 73 includes an engagement protrusion 73b which protrudes from a central portion of the flange 73a outwardly in the width direction and is inserted in the corresponding coil spring 65. Each of the engagement protrusion 73b is formed in a substantially rectangular column in which the rectangle is extended in the front/rear direction.

The flange 73a of each of the memory pins 73 is inserted in the guide hole 71a, and thus a movement of each of the memory pins 73 in the width direction is guided. Each of the flanges 73a includes a guide surface 73c formed at an upper end portion thereof. Each of the guide surfaces 73c includes an inclined configuration that is inclined downwardly towards an inner side end in the width direction. Each of the guide surfaces 73c is formed to be inclined to follow an inclination of the inclined surface 72b of the up/down pin 72 at a position at which the guide surface 73c and the inclined surface 72b are in contact with each other.

At each of the memory pins 73, a guide recessed portion 73d, which is formed in a substantially circular shape recessed outwardly from an inner side end surface in the width direction, is provided. On the other hand, the guide pin 74 includes a substantially circular column shape having an outer diameter that is equivalent to an inner diameter of each of the guide recessed portions 73d. End portions of the guide pin 74 are fitted by insertion in the respective guide recessed portions 73d. Thus, each of the memory pins 73 is allowed to move in the width direction in a state where the memory pins 73 are maintained to be concentric with each other by the guide pin 74. A length of the guide pin 74 is specified to be equivalent to a length that corresponds to a sum of amounts of the recesses of the respective guide recessed portions 73d. Thus, the memory pins 73, which are guided by the guide pin 74, are allowed to move in the width direction in which the memory pins 73 face each other, in a range until the memory pins 73 come in contact with each other, that is until the memory pins 73 come in contact with each other in the width direction.

An accommodation bore 71*b* is provided at the memory base 71 at a position corresponding to the communication hole 61*c* in the up/down direction. The accommodation bore 71*b* is formed in a circular shape and provides communication between a rear end surface of the memory base 71 and the communication hole 61*c* in the front/rear direction. The coil spring 67 is accommodated in the accommodation bore 71*b*. An inner diameter of the accommodation bore 71*b* is specified to be smaller than the opening width of the communication hole 61*c* in the width direction. The plate guide hole 61*e* provides communication to the memory base 71, that is, the plate guide hole 61*e* is formed to penetrate the memory base 71, in the front/rear direction at a position corresponding to a central portion of the accommodation bore 71*b* in the up/down direction. Thus, an inner wall surface of the accommodation bore 71*b* is cut out by the plate guide hole 61*e* to form a groove configuration outwardly in the width direction. The rear stop hole 61*g* is provided below the accommodation bore 71*b* to provide communication between the rear end surface of the memory base 71 and the guide hole 71*a* in the front/rear direction.

The removal prevention plate 75 formed in a shape which is similar to the shape of the removal prevention plate 68 is fixed to the memory base 71, at the pair of side stop portions 61*f* and at the rear stop hole 61*g*. The removal prevention plate 75 includes a top plate portion 75*a* arranged to be spread at an upper surface of the memory base 71. The removal prevention plate 75 includes a pair of first extending wall portions 75*b* extending from respective ends, in the width direction, of the top plate portion 75*a* downwardly along respective side surfaces, in the width direction, of the memory base 71. The removal prevention plate 75 includes a second extending wall portion 75*c* extending from a rear end of the top plate portion 75*a* downwardly along the rear end surface of the memory base 71. A distal end portion of each of the first extending wall portions 75*b* is bent inwardly in the width direction to form a side stop tab 75*d*. A distal end portion of second extending wall portion 75*c* is bent forward to form a rear stop tab 75*e*. In a state where the top plate portion 75*a* is in contact with the upper surface of the memory base 71, the removal prevention plate 75 is fixed to the memory base 71 in such a manner that the side stop tabs 75*d* are inserted in and engaged at the respective side stop portions 61*f* and the rear stop tab 75*e* is inserted in and engaged at the rear stop hole 61*g*. In a similar manner to the removal prevention plate 68, the removal prevention plate 75 fixed at the memory base 71 restricts or controls an uppermost position of the up/down pin 72 and prevents the up/down pin 72 from being removed or coming off upwardly.

An insertion hole 75*l* formed in a substantially quadrangular shape is provided at each of the first extending wall portions 75*b* of the removal prevention plate 75. The engagement protrusion 73*b* of each of the memory pins 73 is configured to be fitted by insertion in the corresponding insertion hole 75*f*. A peripheral edge portion of each of the insertion holes 75*f* is in contact with and pressed against the one distal end of the coil spring 65 accommodated in the guide hole 71*a*, and thus the removal prevention plate 75 prevents the coil spring 65 from being removed or coming off outwardly in the width direction. An annular end surface of each of the flanges 73*a* which surrounds the engagement protrusion 73*b* is in contact with and pressed against the other distal end of the corresponding coil spring 65, and thus the memory pins 73 are always biased inwardly in the width direction.

A pair of guide pieces 75*g* each formed in a flange configuration and serving as the guide member are provided at each of the first extending wall portions 75*b* of the removal prevention plate 75. The guide pieces 75*g* protrude from an upper edge portion and a lower end portion of the insertion hole 75*f*, respectively, inwardly in the width direction. Each of the guide pieces 75*g* is inserted in the guide hole 71*a* and is slidably in contact with the engagement protrusion 73*b* that is fitted by insertion in the insertion hole 75*l*, thereby guiding the movement of the memory pin 73 in the width direction. That is, in a state where the memory pins 73 are biased by the respective coil springs 65 and are in contact with each other, a position of a distal end of each of the engagement protrusions 73*b* substantially coincides with or matches a position of an outer surface of the corresponding first extending wall portion 75*b* in the width direction. In addition, the position of the distal end portion of each of the engagement protrusions 73*b* is overlapped with positions of the corresponding guide pieces 75*g*. As a result, in a case where each of the memory pins 73 moves in the width direction, the engagement protrusion 73*b* is slidably in contact with the guide pieces 75*g* which are provided at the upper edge portion and lower end portion of the insertion hole 75*f*, respectively. When the memory pins 73 move in the width direction, the memory pins 73 are slidably in contact with the guide pin 74 that is the single common guide pin, and thus the memory pins 73 remain to be concentric with each other.

Further, the removal prevention plate 75 is in contact with and pressed against the rear end of the coil spring 67 accommodated in the accommodation bore 71*b*, and thus the removal prevention plate 75 prevents the coil spring 67 from being removed or coming off rearward.

Figure 21A:
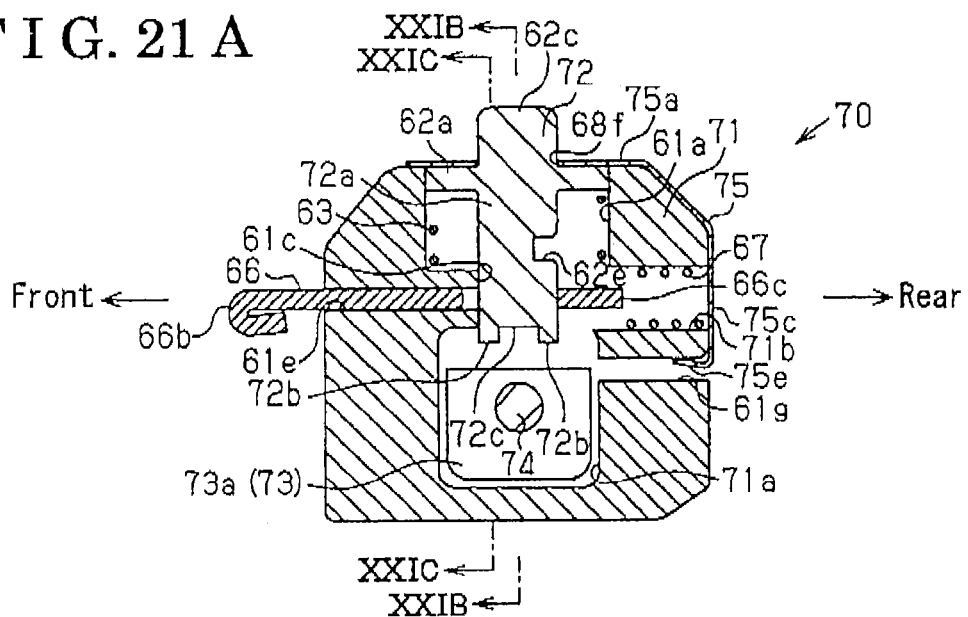
FIG. 21A is a cross-sectional view taken along line XXIA-XXIA in FIG. 21B and illustrates the memory piece in a state where a memory pin is retracted inwardly in the width direction according to the second embodiment.
Figure 21B:
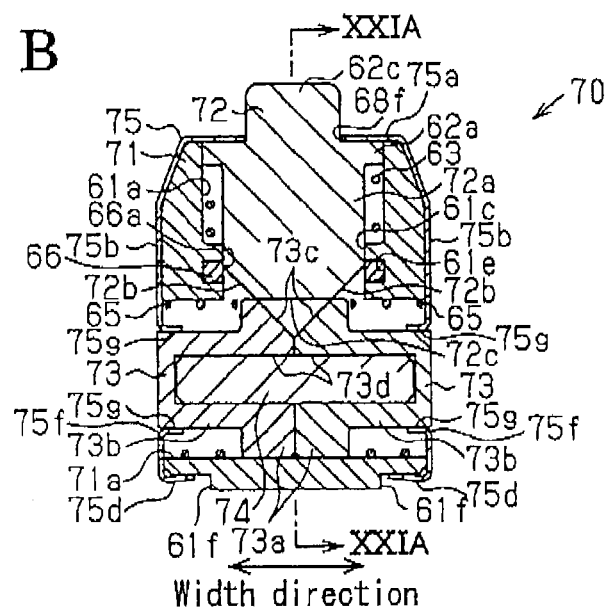
FIG. 21B is a cross-sectional view taken along line XXIB-XXIB in FIG. 21A and illustrates the memory piece in the state where the memory pin is retracted inwardly in the width direction.
Figure 21C:
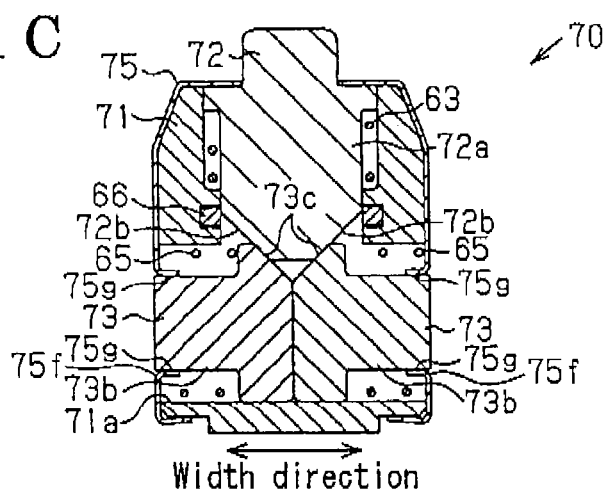
FIG. 21C is a cross-sectional view taken along line XXIC-XXIC in FIG. 21A and illustrates the memory piece in the state where the memory pin is retracted inwardly in the width direction.

As illustrated in FIGS. 21A to 21C, in the retracted state where the engagement protrusions 73*b* of the memory pins 73 are retracted inwardly in the width direction relative to the respective first extending wall portions 75*b* of the removal prevention plate 75, the memory piece 70 is movable in the front/rear direction integrally with the upper rail 15 without causing interference between each of the memory pins 73 and the corresponding first flange 13 of the lower rail 10.

Figure 22A:
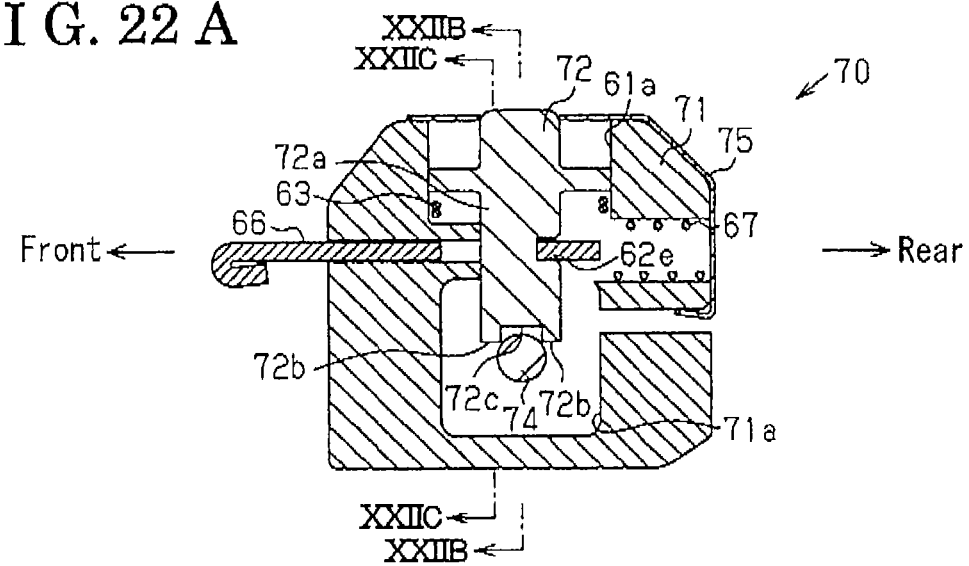
FIG. 22A is a cross-sectional view taken along line XXIIA-XXIIA in FIG. 22B and illustrates the memory piece in a state where the memory pin protrudes outwardly in the width direction according to the second embodiment.
Figure 22B:
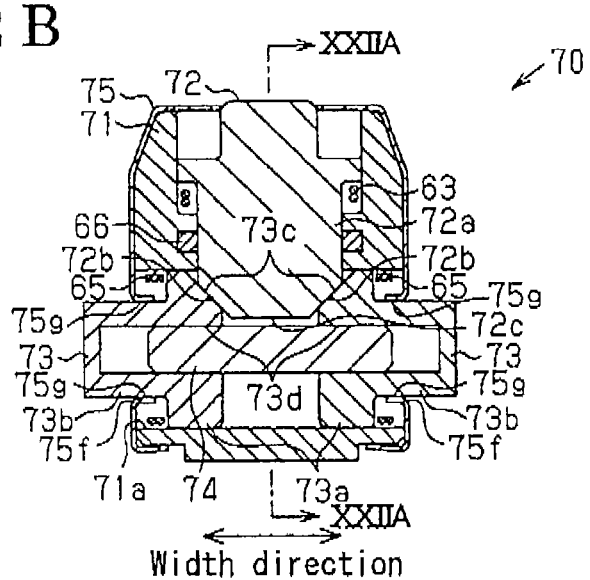
FIG. 22B is a cross-sectional view taken along line XXIIB-XXIIB in FIG. 22A and illustrates the memory piece in the state where the memory pin protrudes outwardly in the width direction.
Figure 22C:
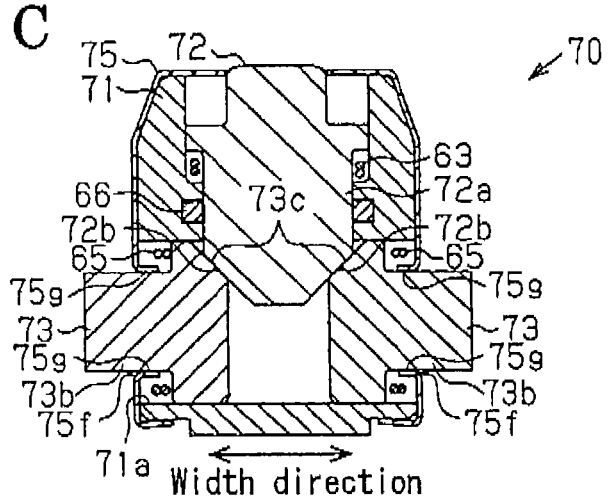
FIG. 22C is a cross-sectional view taken along line XXIIC-XXIIC in FIG. 22A and illustrates the memory piece in the state where the memory pin protrudes outwardly in the width direction.

On the other hand, as illustrated in FIGS. 22A to 22C, in a state where the engagement protrusions 73*b* of the memory pins 73 pass through the respective insertion holes 75*f* of the removal prevention plate 75 to protrude outwardly in the width direction relative to the removal prevention plate 75, for example, each of the engagement protrusions 73*b* is engageable by insertion with one of the plural lock holes 13*a* of the corresponding first flange 13. At this time, each of the engagement protrusions 73*b* formed in the substantially rectangular column is in contact with or is close to the four sides of the corresponding lock hole 13*a* formed in the substantially rectangular shape, and thus the memory pin 73 is prevented from rotating relative to the first flange 13. That is, the memory pins 73 are supported by the memory base 71 and by the removal prevention plate 75 so as to be non-rotatable, and the memory pins 73 are fitted by insertion in the corresponding lock holes 13*a*. As a result, the memory piece 70 is secured at the lower rail 10 to be non-rotatable relative thereto. In the protruding state where the engagement protrusions 73*b* of the memory pins 73 protrude from the removal prevention plate 75 outwardly in the width direction, a lower end (the inclined surfaces 72*b*) of the guide protrusion 72*a* of the up/down pin 72 comes closer to a portion of the guide pin 74 which is exposed between the memory pins 73. However, the lower end of the guide protrusion 72*a* is prevented from interfering with the guide pin 74 because of the recessed portion of the groove portion 72*c*.

As described in detail above, according to the present embodiment, the following effects are obtained in addition to the effects obtained from the first embodiment. (1) According to the present embodiment, the advance and retract of each of the memory pins 73 in the width direction, that is, the movement of the memory pin 73 in the width direction is guided by the guide pieces 75*g*, and thus the engagement with and the disengagement from the lower rail 10 are performed more smoothly. Similarly, the advance and retract of each of the memory pins 73 in the width direction is guided in a state where the memory pins 73 are maintained to be concentric with each other by the guide pin 74, and thus the engagement with and the disengagement from the lower rail 10 are performed more smoothly. Specifically, the advance and retract of each of the memory pins 73 in the width direction is achieved by changing a direction of the movement of the up/down pin 72, which moves in the up/down direction, and thus the smoothness in the movement of each of the memory pins 73 is more effectively enhanced.

A third embodiment of a seat slide apparatus for a vehicle will be explained with reference to the FIGS. 23 and 24. In the third embodiment, only a structure of routing or arranging the first release cable connected to the memory link is different from each of the first and second embodiments, and therefore detailed explanations on the features and/or structures similar to the first and second embodiments will be omitted.

Figure 23:
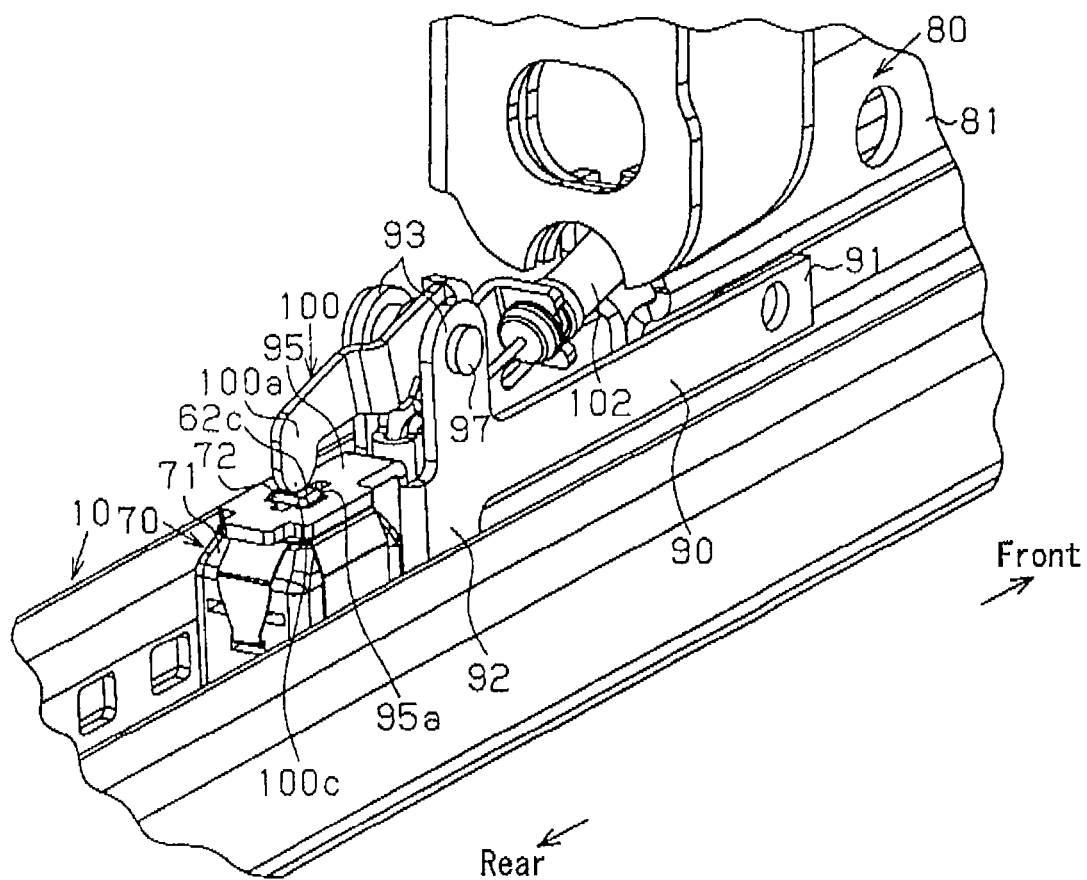
FIG. 23 is a perspective view illustrating a third embodiment disclosed here.

As illustrated in the FIGS. 23 and 24, an upper rail 80 formed in a shape similar to the shape of the upper rail 15 includes a pair of second vertical wall portions 81. An engagement member 90 made of plate material, for example, is fixed to rear ends of the respective second vertical wall portions 81. The engagement member 90 includes a pair of fixing portions 91, a pair of extending portions 92 and a pair of attachment portions 93. The fixing portions 91 each of which is formed in a substantially elongated shape extending in the front/rear direction are joined to the respective second vertical wall portions 81. The extending portions 92 are formed to extend downwardly from rear ends of the fixing portions 91, respectively. The attachment portions 93 are formed to extend upwardly from the rear ends of the fixing portions 91, respectively. In addition, the engagement member 90 includes a stopper portion 94 (i.e., the stopper member), an upper flange 95 and a lower flange 96. The stopper portion 94 including a substantially flat plate shape is connected to rear ends of the respective extending portion 92 and joins the extending portions 92 to each other in the width direction. The upper flange 95 and the lower flange 96 are formed to extend rearward from an upper end and a lower end of the stopper portion 94, respectively.

A space portion surrounded by the stopper portion 94, the upper flange 95 and the lower flange 96 forms an accommodation portion S1. The memory base 71 (the memory piece 70) is accommodated in the accommodation portion S1 in a manner that the memory base 71 is supported by the lower flange 96. The stopper portion 94, which oppose the locking plate 66 at a rear side, is configured to be in contact with the locking plate 66 (the pushed portion 66*b*) in a case where the stopper portion 94 moves rearward together with the upper rail 80. In a state where the memory piece 70 is accommodated in the accommodation portion S1, the stopper portion 94 causes the locking plate 66 to move rearward against the biasing force of the coil spring 67, and thus the up/down pin 72 is movable in the up/down direction. In other words, the restriction on the movement of the up/down pin 72 in the up/down direction, which is imposed in association with the movement of the locking plate 66 in the front direction, is achieved when the stopper portion 94 (the engagement member 90) moves forward together with the upper rail 80 relative to the locking plate 66. The stopper portion 94 constitutes the holding member together with the locking plate 66 and the coil spring 67.

A locking hole 95*a* is provided at the upper flange 95, and the head portion 62*c* of the up/down pin 72 is configured to be fitted by insertion in the locking hole 95*a*. Accordingly, in a state where the engagement protrusions 73*b* of the memory pins 73 are retracted inwardly in the width direction relative to the respective first extending wall portions 75*b* of the removal prevention plate 75 and the head portion 62*c* of the up/down pin 72 protrudes upwardly (refer to FIGS. 21A to 21C), the head portion 620 is inserted to the locking hole 95*a* and is fitted therein. At this time, the memory piece 70 engages with the upper rail 80 at the up/down pins 72, and the memory piece 70 releases the engagement between the memory pins 73 and the lower rail 10. Accordingly, the upper rail 80 is movable in the front/rear direction integrally with the memory piece 70. The up/down pin 72 and the coil spring 63 constitute the restriction piece.

On the other hand, in a state where the head portion 62*c* of the up/down pin 72 is retracted downwardly and the engagement protrusions 73*b* of the memory pins 73 protrude outwardly in the width direction relative to the first extending wall portions 75*b* of the removal prevention plate 75 (refer to FIGS. 22A to 22C), the head portion 62*c* disengages from the locking hole 95*a*. At this time, the memory piece 70 engages with the lower rail 10 at the memory pins 73, and the memory piece 70 releases the engagement between the up/down pins 72 and the upper rail 80. Accordingly, the upper rail 80 is movable forward in a state where the memory piece 70 is left or remains at the position where the memory piece 70 is fixed to the lower rail 10.

End portions of a support shaft 97 are fixed to upper end portions of the attachment portions 93, respectively. The support shaft 97 is arranged to penetrate the attachment portions 93 in the width direction. A memory link 100 (i.e., the interlocking mechanism) made of plate material, for example, is rotatably supported at a central portion, which is disposed between the attachment portions 93, of the support shaft 97.

The memory link 100 includes an operation piece 100*a* and an attachment piece 100*b*. The operation piece 100*a* is formed substantially in a shape of a letter L extending in a radial direction relative to the support shaft 97, obliquely rearward in a lower direction. The attachment piece 100*b* is formed substantially in a shape of a letter I extending in the radial direction relative to the support shaft 97 downwardly. A distal end portion 100*c* of the operation piece 100*a* is bent downwardly, and opposes the up/down pin 72 of the memory piece 70, which is accommodated in the accommodation portion S1, in the clockwise direction relative to the support shaft 97 in FIG. 24. Accordingly, in a case where the memory link 100 rotates in the clockwise direction relative to the support shaft 97 in FIG. 24, the distal end portion 100*c* of the operation piece 100*a* pushes the up/down pin 72, and thus the up/down pin 72 is lowered against the biasing force of the coil spring 63.

A torsion coil spring 101 is wound around the support shaft 97. One end of the torsion coil spring 101 is engaged and locked at the memory link 100, and the other end of the torsion coil spring 101 is engaged and locked at the engagement member 90. The torsion coil spring 101 biases the memory link 100 so that the memory link 100 rotates in the counterclockwise direction in FIG. 24. The memory link 100 is configured so that the initial rotation position, at which the up/down pin 72 is released, is held by the biasing force of the torsion coil spring 101.

One end 102a of a first release cable 102 (i.e., a cable), which is similar to the first release cable 43, is engaged and locked at attachment piece 100b of the memory link 100. The first release cable 102 extends forward from the attachment piece 100b and the other end of the first release cable 102 is connected to the seatback 7. In a case where the seatback 7 is folded forward, the attachment piece 100b is pulled in the front direction by the first release cable 102 to thereby rotate the memory link 100 in the clockwise direction in FIG. 24 (which will be referred to also as "a release direction") about the support shaft 97 against the biasing force of the torsion coil spring 101. At this time, the up/down pin 72 pushed by the distal end portion 100c of the operation piece 100a moves downwardly against the biasing force of the coil spring 63 as described above.

An insertion opening 81a formed in a substantially quadrangular shape is provided at one of the second vertical wall portions 81 of the upper rail 80. The first release cable 102 is introduced from the insertion opening 81a to an inside of the upper rail 80, and extends rearward in a state to be disposed between the vertical wall portions 81. The first release cable 102 is connected to the memory link 100 at the first end 102a. Due to the above-described structure, a portion of the first release cable 102 connected to the memory link 100 is accommodated within the upper rail 80, and therefore a space for the routing or the arrangements of the first release cable 102, which is necessary to be provided outside the upper rail 80, is more reduced.

As described in detail above, according to the present embodiment, the following effects are obtained in addition to the effects obtained from the second embodiment. (1) According to the present embodiment, the first release cable 102 is accommodated within the upper rail 80, and thus the space that is needed to be provided outside the upper rail 80 for the routing or arrangements of the first release cable 102 is more reduced.

The aforementioned embodiments may be changed or modified as follows. In the first embodiment, the memory piece may include one memory pin 64 and one coil spring 65 each of which is provided at only one side.

In the third embodiment, the memory piece 60 may be used instead of the memory piece 70. In the second and third embodiments, the guide pin 74 may be omitted from the structure.

In the second and third embodiments, one of the both guide pieces 75g that are provided at each of the insertion holes 75f may be omitted. Alternatively, the guide piece may be provided at at least one position of the upper edge portion, the lower edge portion, a front edge portion and a rear edge portion of each of the insertion holes 75f.

In the second and third embodiments, the memory piece may include the memory pin 73 and the coil spring 65 each of which is provided at only one side. In this case, the guide pin 74 may be omitted from the structure. Alternatively, a guide portion which is similar to the guide pin 74 and includes a substantially circular columnar shape may be protrudingly formed at the other side so that the advance and retract of the memory pin 73 is guided by the guide portion.

In each of the aforementioned embodiments, independently of or separately from the lock holes 13a, a fitting recessed portion to which the memory pin 64, 73 (the engagement protrusion 64b, 73b) is inserted and fitted may be provided at each of the first flanges 13 of the lower rail 10. In this case, each of the fitting recessed portions may include a configuration of a through hole providing communication in the width direction, that is, penetrating the first flange 13a in the width direction or a configuration of a hole that is recessed outwardly in the width direction. Each of the fitting recessed portions may be arranged to be off-set or shifted relative to the lock hole 13a in the up/down direction or in the front/rear direction.

In each of the aforementioned embodiments, an appropriate locking tab may be formed at a rear portion of the locking plate 66 by cutting and raising up the rear portion. The locking tab may be fitted by insertion in the locking groove 62e of the up/down pin 62, 72 for restricting the up/down pin 62, 72 from moving upward. In this case, a position of the locking plate 66 itself in the up/down direction and a position of the locking tab which is engaged in the locking groove 62e in the up/down direction may be off-set or shifted relative to each other, that is, do not need to match in the up/down direction.

In each of the aforementioned embodiments, the configuration of the holding member (the stopper member 32 or the stopper portion 94, the locking plate 66 and the coil spring 67, for example), which holds the protruding state of the memory pin 64, 73 where the memory pin 64, 73 protrudes outwardly in the width direction, is an example. For example, a moving direction of the locking plate 66 and/or a biasing direction of the coil spring 67 may be specified in an arbitrary direction that differs from the width direction.

In each of the aforementioned embodiments, the stopper member 32 or the stopper portion 94, the locking plate 66, the coil spring 67, for example, may be omitted. In this case, an appropriate memory-holding bracket may be provided. The memory-holding bracket may be configured to move to an upper side relative to the up/down pin 62, 72, that is, above the up/down pin 62, 72, in a case where the upper rail 15, 80 moves in the front direction of the seat after the seatback 7 is folded forward. The memory-holding bracket keeps pushing or pressing the up/down pin 62, 72 downwardly so that the engagement state between the up/down pin 62, 72 and the lower rail 10, for example, is maintained.

In each of the aforementioned embodiments, the coil spring 63 which biases the up/down pin 62, 72 upwardly may be omitted. The up/down pin 62, 72 may be biased upwardly by the coil springs 65 which bias the respective memory pins 64 inwardly in the width direction.

In each of the aforementioned embodiments, the memory pins 64, 73 are advanced from and retracted into the memory base 61, 71 due to the movement of the up/down pin 62, 72 in the up/down direction. However, the memory pins 64, 73 may be advanced from and retracted into the memory base 61, 71 due to the movement of the up/down pin in the front/rear direction, for example. In this case, for example, a direction in which the memory link pushes the up/down pin may be changed to match the moving direction of the up/down pin.

In each the aforementioned embodiments, the memory link 40, 100 causes the memory pins 64, 73 to protrude outwardly in the width direction by pushing the memory pins 64, 73 via the up/down pin 62, 72. However, the memory link 40, 100 may push the memory pins 64, 73 directly so that the memory pins 64, 73 protrude outwardly in the width direction.

In each of the aforementioned embodiments, the configuration of the interlocking mechanism (the memory link 40, 100, the first release lever 50, the lever member 51, the connecting link 52, for example), which pushes the lock lever 23 in the rotation direction in which the restriction on the relative movement between the lower rail 10 and the upper rail 15, 80 relative to each other is released and pushes the memory pins 64, 73 so that the memory pins 64, 73 protrude outwardly in the width direction, is an example.

In each of the aforementioned embodiments, the engagement protrusion 64b of the memory pin 64 may be formed in an elliptic column or in an oval column as long as the engagement protrusion 64b is formed in an elongated-circular column. In a similar manner thereto, the engagement protrusion 73b of the memory pin 73 may be formed in an elongated-circular column (an elliptic column, an oval column). In addition, the engagement protrusion 64b, 73b of the memory pin 64, 73 may be formed in a circular column as long as the posture of the memory base 61 is stabilized in the engaged state where the memory base 61 is engaged with the lower rail 10.

Each of the aforementioned embodiments may be configured so that the parts that are accommodated in the memory base 61, 71 (the up/down pin 62, 72, for example) are prevented from coming off by means of the memory base 61, 71 by itself, that is, without another part used in addition to the memory base 61, 71. For example, an appropriate step portion which prevents the accommodated parts from coming off may be provided at the memory base 61, 71. In this case, the removal prevention plate 68, 75 may be omitted.

In each of the aforementioned embodiments, the memory piece 60, 70 may be provided at, for example, the upper rails 15, 80 on both first and second sides, and the memory link 40, 100 may be provided at the upper rails 15, 80 on both first and second sides. That is, the mechanism, which is related to the return operation to the memory position after the seatback 7 is folded forward, may be provided at, for example, the upper rails 15, 80 on both first and second sides.

In each of the aforementioned embodiments, an axis line (the support shaft 41, 97) of the memory link 40, 100 needs not be arranged along the width direction. In each of the aforementioned embodiments, each of the lower rails 10 may be made of plural plate materials joined to each other by welding, for example.

In each of the aforementioned embodiments, each of the upper rails 15 may be made of plural plate materials joined to each other by welding, for example. In each of the aforementioned embodiments, the movement of the upper rail 15, 80 (the seat 5) in the front direction in association with the forward-folding of the seatback 7 may be performed by a biasing force of an appropriate biasing member, or by a manual operation of the occupant, for example.

In each of the aforementioned embodiments, a single lower rail 10 and a single upper rail 15, 80 may be provided at the seat 5, or three or more of the lower rails 10 and three or more of the upper rails 15, 80 may be provided at the seat 5.

In each of the aforementioned embodiments, the direction of the relative movement between the lower rail and the upper rail may correspond to a width direction of the vehicle, for example.

According to the aforementioned embodiments, the seat slide apparatus for the vehicle includes the lower rails 10 attached to the vehicle floor 1, the lower rail 10 including the pair of first vertical wall portions 11 arranged side by side with each other to face each other in the width direction of the lower rail 10, the bottom wall portion 12 connecting the lower ends of the respective first vertical wall portions 11 to each other, the pair of flanges 13 extending from the upper ends of the respective first vertical wall portions 11 inwardly in the width direction to face each other and folded back towards the lower ends of the first vertical wall portions 11, each of the flanges 13 being provided with the plurality of the lock holes 13a (i.e., the fitting recessed portions 13a) arranged side by side with one another in the front/rear direction of a seat 5, the upper rails 15, 80 attached to the seat 5 and connected to the lower rails 10 in a manner that a relative movement of the upper rails 15, 80 relative to the lower rails 10 is allowed, the upper rail 15, 80 including the accommodation portion S, S1 provided at the rear end of the upper rail 15, 80, the seat 5 including the seatback 7 that is provided at the rear end portion of the seat 5 in the front/rear direction of the seat, the lock levers 23 selectively applying the restriction on the relative movement between the lower rails 10 and the upper rails 15, 80, the memory base 61, 71 disposed between the flanges 13 of the lower rail 10 in the width direction and arranged above the bottom wall portion 12 of the lower rail 10, the memory base 61, 71 being restricted from moving in the front direction of the seat relative to the accommodation portion S, S1 in the accommodated state in which the memory base 61, 71 is accommodated in the accommodation portion S, S1, the restriction piece 31 (i.e., the restriction piece), the coil spring 63 (i.e., the restriction piece) and the up/down pin 72 (i.e., the restriction piece) which hold the memory base 61, 71 in the accommodated state by means of the biasing force so that the memory base 61, 71 is restricted from moving in the rear direction of the seat relative to the accommodation portion S, S1, the memory pins 64, 73 attached to the memory base 61, 71 in a manner that the advance and retract of each of the memory pins 64, 73 in the width direction relative to the memory base 61, 71 is allowed, each of the memory pins 64, 73 being fitted in one of the lock holes 13a of the lower rail 10 so that the memory pin 64, 73 engages with the lower rail 10 in a case where the memory pins 64, 73 are in the protruding state in which the memory pins 64, 73 protrude outwardly in the width direction, each of the memory pins 64, 73 being disengaged from one of the lock holes 13a in the retracted state in which the memory pins 64, 73 are retracted inwardly in the width direction so that the memory pins 64, 73 disengage from the lower rail 10, the coil springs 65 (i.e., the biasing member) biasing the memory pins 64, 73 in the direction in which the memory pins 64, 73 retract inwardly in the width direction, the interlocking mechanism (i.e., the memory link 40, 100, the first release lever 50, the lever member 51, the connecting link 52), in the forward-folded state of the seatback 7, pushing the lock lever 23 in the direction in which the restriction on the relative movement of the upper rail 15, 80 relative to the lower rail 10 is released and pushing the memory pins 64, 73 so that the memory pins 64, 73 protrudes outwardly in the width direction, and the holding member (i.e., the stopper member 32, the locking plate 66, the coil spring 67, the stopper portion 94) holding the protruding state of the memory pins 64, 73 and allow the memory base 61, 71 to move in the rear direction of the seat relative to the accommodation portion 5, S1 against the biasing force of the restriction piece 31 and the coil spring 63, the holding member (i.e., the stopper member 32, the locking plate 66, the coil spring 67, the stopper portion 94 releasing the protruding state of the memory pins 64, 73 in a case where the locking plate 66 (i.e., the holding member) is pushed by the upper rail 15, 80 moving in the rear direction of the seat.

According to the above-described configuration, in a normal state (that is, in the state where the seatback 7 is not folded forward), when the memory base 61, 71 is in the accommodated state in the accommodation portion S, S1, the memory pins 64, 73 are retracted inwardly in the width direction relative to the memory base 61, 71 and the movement of the memory base 61, 71 in the front/rear direction of the seat relative to the accommodation portion S, S1 is restricted due to the accommodation portion 5, S1, the restriction piece 31, the coil spring 63 and the up/down pin 72. Accordingly, in a case where the lower rail 10 and the upper rail 15, 80 move relative to each other, the memory base 61, 71 and memory pins 64, 73 move integrally with the upper rail 15, 80.

On the other hand, in the forward-folded state of the seatback 7, in a case where the memory base 61, 71 is in the accommodated state in the accommodation portion S, S1, the lock lever 23 is pushed by the first release lever 50 (i.e., the interlocking mechanism) in the rotation direction in which the lock lever 23 releases the restriction on the relative movement between the lower rail 10 and the upper rail 15, 80 relative to each other and the memory pins 64, 73 are pushed so as to protrude from the memory base 61, 71 outwardly in the width direction against the biasing force of the respective coil springs 65. In addition, the holding member (i.e., the stopper member 32, the locking plate 66, the coil spring 67, the stopper portion 94) hold the state where the memory pins 64, 73 protrude from the memory base 61, 71 outwardly in the width direction, that is, the state where the memory pins 64, 73 engage with the lower rail 10, and the memory base 61, 71 is allowed to move in the rear direction of the seat relative to the accommodation portion S, S1 against the biasing force of the restriction piece 31 and the coil spring 63. Accordingly, the upper rail 15, 80 comes to be movable in the front direction of the seat in a state where the memory base 61, 71 is left, that is, remains at a present position. In a case where the upper rail 15 moves in the front direction of the seat, the restriction piece 31 passes over the memory base 61 that is fixed to the lower rail 10 while the restriction piece 31 is being elastically deformed.

After that, in a case where the upper rail 15 which has moved in the front direction of the seat moves in the rear direction of the seat, the restriction piece 31 passes over the memory base 61 that is fixed to the lower rail 10 while the restriction piece 31 is being elastically deformed. When the accommodation portion S, S1 is in contact with the memory base 61, 71, the upper rail 15, 80 is restricted from moving. At this time, the relative position of the lower rail 10 and the upper rail 15, 80 relative to each other returns to the position immediate before the upper rail 15, 80 moves in the front direction of the seat in the forward-folded state of the seatback 7 (that is, the memory position). In addition, at this time, the locking plate 66 (i.e., the holding member) is pushed by the upper rail 15, 80, and thus the state where the memory pins 64, 73 protrude from the memory base 61, 71 outwardly in the width direction, that is, the state where the memory pins 64, 73 engage with the lower rail 10, may be released.

Accordingly, in the above-described state, when the forward-folded state of the seatback 7 is released, the lock lever 23 released from the pushing force of the first release lever 50 restricts the relative movement between the lower rail 10 and the upper rail 15, 80. In addition, the memory pins 64, 73 released from the pushing force of the interlocking mechanism (i.e., the memory link 40, 100, the first release lever 50, the lever member 51, the connecting link 52) is biased by the coil spring 65 and retract inwardly in the width direction relative to the memory base 61, 71. Thus, in a case where the lower rail 10 and the upper rail 15, 80 move relative to each other thereafter, the memory base 61, 71 and the memory pins 64, 73 are movable integrally with the upper rail 15, 80.

As described above, the memory function is achieved in a state where the memory base 61, 71 remains to be arranged above the bottom wall portion 12 regardless of the state of the memory pins 64, 73. As a result, the restriction or constraint by the lower rails 10 is reduced.

The aforementioned embodiments obtain the advantageous effect that the restriction or constraint by the lower rail is reduced and the memory function is achieved.

According to the aforementioned embodiments, the holding member 32, 66, 67, 94 includes the locking plate 66 attached to the memory base 61, 71 to be movable relative to the memory base 61, 71 in the direction which is different from the width direction, the locking plate 66 restricting the memory pin 64, 73 from moving inwardly in the width direction in a state where the locking plate 66 moves in one direction when the memory pin 64, 73 is in the protruding state in which the memory pin 64, 73 protrudes from the memory base 61, 71 outwardly in the width direction, the locking plate 66 releasing the restriction on the movement of the memory pin 64, 73 inwardly in the width direction in a state where the locking plate 66 moves in an opposite direction which is opposite to the one direction, the holding member 32, 66, 67, 94 includes the coil spring 67 biasing the locking plate 66 in the direction in which the locking plate 66 moves in the one direction, and the upper rail 15, 80 includes the stopper member 32, 94 which is brought in contact with the locking plate 66 for moving the locking plate 66 in the opposite direction and releases the restriction on the movement of the memory pin 64, 73 inwardly in the width direction in association with movement of the upper rail 15, 80 in the rear direction of the seat.

According to the aforementioned embodiments, the first flange 13 of each of the lower rails 10 includes the plurality of lock holes 13*a* arranged side by side with one another in the front/rear direction of the seat, the lock lever 23 includes the lock protrusions 23*b* inserted in the corresponding lock holes 13*a* and disengaging therefrom for selectively restricting the relative movement between the lower rail 10 and the upper rail 15, 80, and the lock holes 13*a* are used also as the fitting recessed portions 13*a*.

According to the above-described configuration, the lock holes 13*a* that are related to the selective restriction on the relative movement between the lower rail 10 and the upper rail 15, 80 are utilized also as the fitting recessed portions 13*a*. As a result, the workload for the machining of the lower rail 10 is reduced.

According to the aforementioned embodiments, the memory pins 64, 73 are attached to the memory base 61, 71 to be non-rotatable relative to the memory base 61, 71, and each of the memory pins 64, 73 includes the engagement protrusion 64*b*, 73*b* fitted by insertion in the corresponding lock hole 13*a* of the flange 13 to be non-rotatable relative to the lock hole 13*a* in a case where the memory pins 64, 73 are in the protruding state in which the memory pins 64, 73 protrude from the memory base 61, 71 outwardly in the width direction.

According to the above-described configuration, in a state where the memory pins 64, 73 protrude from the memory base 61, 71 outwardly in the width direction, the engagement protrusions 64*b*, 73*b* are fitted by insertion in the corresponding lock holes 13*a* to be non-rotatable relative thereto. As a result, the memory pins 64, 73 are restricted, together with the memory base 61, 71, from rotating relative to the lower rail 10. Accordingly, the posture of the memory base 61, 71 is more stabilized in the engagement state where the memory base 61, 71 engages with the lower rail 10, thereby the return operation to the memory position is more stabilized.

According to the aforementioned embodiments, the interlocking mechanism 40, 50, 51, 52, 100 includes the lever member 51 and the first release lever 50 configured to push the lock lever 23 in the direction in which the restriction on the relative movement of the upper rail 15, 80 relative to the lower rail 10 is released, the memory link 40, 100 pushing the memory pins 64, 73 so that the memory pins 64, 73 protrude outwardly in the width direction in the forward-folded state of the seatback 7, and the connecting link 52 connected to each of the lever member 51, the first release lever 50 and the memory link 40, 100, and causing the lever member 51 and the first release lever 50 to push the lock lever 23 in the direction in which the restriction on the relative movement of the upper rail 15, 80 relative to the lower rail 10 is released in the forward-folded state of the seatback 7.

According to the above-described configuration, the interlocking mechanism is constituted by the first release lever 50, the lever member 51, the memory link 40, 100 and the connecting link 52 in the extremely simple manner.

According to the aforementioned embodiments, the locking holes 13a are provided at each of the pair of first flanges 13 of the lower rail 10 in a manner that the locking holes 13a provided at one of the pair of first flanges 13 and the locking holes 13a provided the other of the pair of first flanges 13 face each other in the width direction, the memory pin 64, 73 includes the pair of memory pins 64, 73 to fit in the corresponding fitting recessed portions 13a which are provided to face each other in the width direction, and the interlocking mechanism (i.e., the memory link 40, 100, the first release lever 50, the lever member 51, the connecting link 52), push the pair of memory pins 64, 73 at the same time for causing the memory pins 64, 73 to protrude outwardly in the width direction.

According to the aforementioned embodiments, the seat slide apparatus further includes the guide pin 74 (i.e., the guide member) and the guide piece 75g (i.e., the guide member) which guide each of the memory pins 73 to advance and retract in the width direction relative to the memory base 71.

According to the above-described configuration, the advance and retract of the memory pins 73 in the width direction are guided by the guide pin 74 and the guide pieces 75g. As a result, the engagement of the memory pins 73 with the lower rail 10 and the disengagement of the memory pins 73 from the lower rail 10 are performed more smoothly.

According to the aforementioned embodiments, the memory link 100 is connected to the seatback 7 via the first release cable 102 (i.e., the cable) and the first release cable 102 is accommodated within the upper rail 80.

According to the above-described configuration, the first release cable 102 is accommodated within the upper rail 80. As a result, the space for routing or arranging the first release cable 102, which is necessary to be provided outside the upper rail 80, is more reduced.

According to the aforementioned embodiments, the seat slide apparatus for the vehicle includes the lower rails 10 configured to be fixed to the vehicle floor 1, the lower rail 10 including the pair of first vertical wall portions 11 arranged side by side with each other to face each other in the width direction of the lower rail 10, the bottom wall portion 12 connecting the lower ends of the respective first vertical wall portions 11 to each other, the pair of flanges 13 extending from the upper ends of the respective first vertical wall portions 11 inwardly in the width direction to face each other and folded back towards the lower ends of the first vertical wall portions 11, each of the flanges 13 being provided with the plurality of the lock holes 13a (i.e., the fitting recessed portions 13a) arranged side by side with one another in the front/rear direction of a seat 5, the upper rails 15, 80 configured to be fixed to the seat 5 and connected to the lower rails 10 in a manner that a relative movement of the upper rails 15, 80 relative to the lower rails 10 is allowed, the upper rail 15, 80 including the accommodation portion S, S1 provided at the rear end of the upper rail 15, 80, the seat 5 including the seatback 7 that is provided at the rear end portion of the seat 5 in the front/rear direction of the seat, the lock levers 23 selectively applying the restriction on the relative movement between the lower rails 10 and the upper rails 15, 80, the memory base 61, 71 disposed between the flanges 13 of the lower rail 10 in the width direction and arranged above the bottom wall portion 12 of the lower rail 10, the memory base 61, 71 being restricted from moving in the front direction of the seat relative to the accommodation portion S, S1 in the accommodated state in which the memory base 61, 71 is accommodated in the accommodation portion S, S1, the restriction piece 31 (i.e., the restriction piece), the coil spring 63 (i.e., the restriction piece) and the up/down pin 72 (i.e., the restriction piece) which hold the memory base 61, 71 in the accommodated state by means of the biasing force so that the memory base 61, 71 is restricted from moving in the rear direction of the seat relative to the accommodation portion S, S1, the memory pins 64, 73 attached to the memory base 61, 71 in a manner that the advance and retract of each of the memory pins 64, 73 in the width direction relative to the memory base 61, 71 is allowed, each of the memory pins 64, 73 being fitted in one of the lock holes 13a of the lower rail 10 so that the memory pin 64, 73 engages with the lower rail 10 in a case where the memory pins 64, 73 are in the protruding state in which the memory pins 64, 73 protrude outwardly in the width direction, each of the memory pins 64, 73 being disengaged from one of the lock holes 13a in the retracted state in which the memory pins 64, 73 are retracted inwardly in the width direction so that the memory pins 64, 73 disengage from the lower rail 10, the coil springs 65 (i.e., the biasing member) biasing the memory pins 64, 73 in the direction in which the memory pins 64, 73 retract inwardly in the width direction, the interlocking mechanism (i.e., the memory link 40, 100, the first release lever 50, the lever member 51, the connecting link 52), in the forward-folded state of the seatback 7, pushing the lock lever 23 in the direction in which the restriction on the relative movement of the upper rail 15, 80 relative to the lower rail 10 is released and pushing the memory pins 64, 73 so that the memory pins 64, 73 protrudes outwardly in the width direction, and the holding member (i.e., the stopper member 32, the locking plate 66, the coil spring 67, the stopper portion 94) holding the protruding state of the memory pins 64, 73 and allow the memory base 61, 71 to move in the rear direction of the seat relative to the accommodation portion S, S1 against the biasing force of the restriction piece 31 and the coil spring 63, the holding member (i.e., the stopper member 32, the locking plate 66, the coil spring 67, the stopper portion 94 releasing the protruding state of the memory pins 64, 73 in a case where the locking plate 66 (i.e., the holding member) is pushed by the upper rail 15, 80 moving in the rear direction of the seat.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat slide apparatus for a vehicle, comprising:
a lower rail attached to a vehicle floor, the lower rail including a pair of vertical wall portions arranged side by side with each other to face each other in a width direction of the lower rail, a bottom wall portion connecting lower ends of the respective vertical wall portions to each other, a pair of flanges extending from upper ends of the respective vertical wall portions inwardly in the width direction to face each other and folded back towards the lower ends of the vertical wall portions, each of the flanges being provided with a plurality of fitting recessed portions arranged side by side with one another in a front/rear direction of a seat;

an upper rail attached to the seat and connected to the lower rail in a manner that a relative movement of the upper rail relative to the lower rail is allowed, the upper rail including an accommodation portion provided at a rear end of the upper rail, the seat including a seatback that is provided at a rear end portion of the seat in the front/rear direction of the seat;

a lock member selectively applying restriction on the relative movement between the lower rail and the upper rail;

a memory base disposed between the flanges of the lower rail in the width direction and arranged above the bottom wall portion of the lower rail, the memory base being restricted from moving in the front direction of the seat relative to the accommodation portion in an accommodated state in which the memory base is accommodated in the accommodation portion;

a restriction piece holding the memory base in the accommodated state by a biasing force so that the memory base is restricted from moving in a rear direction of the seat relative to the accommodation portion;

a memory pin attached to the memory base in a manner that advance and retract of the memory pin in the width direction relative to the memory base is allowed, the memory pin being fitted in one of the fitting recessed portions of the lower rail so that the memory pin engages with the lower rail in a case where the memory pin is in a protruding state in which the memory pin protrudes outwardly in the width direction, the memory pin being disengaged from one of the fitting recessed portions in a retracted state in which the memory pin is retracted inwardly in the width direction so that the memory pin disengages from the lower rail;

a biasing member biasing the memory pin in a direction in which the memory pin retracts inwardly in the width direction;

an interlocking mechanism, in a forward-folded state of the seatback, pushing the lock member in a direction in which the restriction on the relative movement of the upper rail relative to the lower rail is released and pushing the memory pin so that the memory pin protrudes outwardly in the width direction; and a holding member holding the protruding state of the memory pin and allowing the memory base to move in the rear direction of the seat relative to the accommodation portion against the biasing force of the restriction piece, the holding member releasing the protruding state of the memory pin in a case where the holding member is pushed by the upper rail moving in the rear direction of the seat.

2. The seat slide apparatus according to claim 1, wherein the holding member includes a shutter member attached to the memory base to be movable relative to the memory base in a direction which is different from the width direction, the shutter member restricting the memory pin from moving inwardly in the width direction in a state where the shutter member moves in one direction when the memory pin is in the protruding state in which the memory pin protrudes from the memory base outwardly in the width direction, the shutter member releasing the restriction on the movement of the memory pin inwardly in the width direction in a state where the shutter member moves in an opposite direction which is opposite to the one direction, the holding member includes a second biasing member biasing the shutter member in a direction in which the shutter member moves in the one direction, and the upper rail includes a stopper member which is brought in contact with the shutter member for moving the shutter member in the opposite direction and releases the restriction on the movement of the memory pin inwardly in the width direction in association with movement of the upper rail in the rear direction of the seat.

3. The seat slide apparatus according to claim 2, wherein the flange of the lower rail includes a plurality of lock holes arranged side by side with one another in the front/rear direction of the seat, the lock member includes a lock protrusion inserted in the corresponding lock hole and disengaging therefrom for selectively restricting the relative movement between the lower rail and the upper rail, and the lock holes are used also as the fitting recessed portions.

4. The seat slide apparatus according to claim 2, wherein the memory pin is attached to the memory base to be non-rotatable relative to the memory base, and the memory pin includes an engagement protrusion fitted by insertion in the corresponding fitting recessed portion of the flange to be non-rotatable relative to the fitting recessed portion in a case where the memory pin is in the protruding state in which the memory pin protrudes from the memory base outwardly in the width direction.

5. The seat slide apparatus according to claim 1, wherein the flange of the lower rail includes a plurality of lock holes arranged side by side with one another in the front/rear direction of the seat, the lock member includes a lock protrusion inserted in the corresponding lock hole and disengaging therefrom for selectively restricting the relative movement between the lower rail and the upper rail, and the lock holes are used also as the fitting recessed portions.

6. The seat slide apparatus according to claim 5, wherein the memory pin is attached to the memory base to be non-rotatable relative to the memory base, and the memory pin includes an engagement protrusion fitted by insertion in the corresponding fitting recessed portion of the flange to be non-rotatable relative to the fitting recessed portion in a case where the memory pin is in the protruding state in which the memory pin protrudes from the memory base outwardly in the width direction.

7. The seat slide apparatus according to claim 1, wherein the memory pin is attached to the memory base to be non-rotatable relative to the memory base, and the memory pin includes an engagement protrusion fitted by insertion in the corresponding fitting recessed portion of the flange to be non-rotatable relative to the fitting recessed portion in a case where the memory pin is in the protruding state in which the memory pin protrudes from the memory base outwardly in the width direction.

8. The seat slide apparatus according to claim 1, wherein the interlocking mechanism includes a release lever configured to push the lock member in the direction in which the restriction on the relative movement of the upper rail relative to the lower rail is released, a memory link pushing the memory pin so that the memory pin protrudes outwardly in the width direction in the forward-folded state of the seatback, and a connecting link connected to each of the release lever and the memory link, and causing the release lever to push the lock member in the direction in which the restriction on the relative movement of the upper rail relative to the lower rail is released in the forward-folded state of the seatback.

9. The seat slide apparatus according to claim 8, wherein the memory link is connected to the seatback via a cable and the cable is accommodated within the upper rail.

10. The seat slide apparatus according to claim 1, wherein
the fitting recessed portions are provided at each of the pair of flanges of the lower rail in a manner that the fitting recessed portions provided at one of the pair of flanges and the fitting recessed portions provided the other of the pair of flanges face each other in the width direction,
the memory pin includes a pair of memory pins to fit in the corresponding fitting recessed portions which are provided to face each other in the width direction, and
the interlocking mechanism pushes the pair of memory pins at the same time for causing the memory pins to protrude outwardly in the width direction.

11. The seat slide apparatus according to claim 1, further comprising:
a guide member guiding the memory pin to advance and retract in the width direction relative to the memory base.

12. A seat slide apparatus for a vehicle, comprising:
a lower rail configured to be fixed to a vehicle floor, the lower rail including a pair of vertical wall portions arranged side by side with each other to face each other in a width direction of the lower rail, a bottom wall portion connecting lower ends of the respective vertical wall portions to each other, a pair of flanges extending from upper ends of the respective vertical wall portions inwardly in the width direction to face each other and folded back towards the lower ends of the vertical wall portions, each of the flanges being provided with a plurality of fitting recessed portions arranged side by side with one another in a front/rear direction of a seat;
an upper rail configured to be fixed to the seat and connected to the lower rail in a manner that a relative movement of the upper rail relative to the lower rail is allowed, the upper rail including an accommodation portion provided at a rear end of the upper rail, the seat including a seatback that is provided at a rear end portion of the seat in the front/rear direction of the seat;
a lock member selectively applying restriction on the relative movement between the lower rail and the upper rail;
a memory base disposed between the flanges of the lower rail in the width direction and arranged above the bottom wall portion of the lower rail, the memory base being restricted from moving in the front direction of the seat relative to the accommodation portion in an accommodated state in which the memory base is accommodated in the accommodation portion;
a restriction piece holding the memory base in the accommodated state by a biasing force so that the memory base is restricted from moving in a rear direction of the seat relative to the accommodation portion;
a memory pin attached to the memory base in a manner that advance and retract of the memory pin in the width direction relative to the memory base is allowed, the memory pin being fitted in one of the fitting recessed portions of the lower rail so that the memory pin engages with the lower rail in a case where the memory pin is in a protruding state in which the memory pin protrudes outwardly in the width direction, the memory pin being disengaged from one of the fitting recessed portions in a retracted state in which the memory pin is retracted inwardly in the width direction so that the memory pin disengages from the lower rail;
a biasing member biasing the memory pin in a direction in which the memory pin retracts inwardly in the width direction;
an interlocking mechanism, in a forward-folded state of the seatback, pushing the lock member in a direction in which the restriction on the relative movement of the upper rail relative to the lower rail is released and pushing the memory pin so that the memory pin protrudes outwardly in the width direction; and
a holding member holding the protruding state of the memory pin and allowing the memory base to move in the rear direction of the seat relative to the accommodation portion against the biasing force of the restriction piece, the holding member releasing the protruding state of the memory pin in a case where the holding member is pushed by the upper rail moving in the rear direction of the seat.

\* \* \* \* \*